US008564839B2

(12) United States Patent
Kawai et al.

(10) Patent No.: US 8,564,839 B2
(45) Date of Patent: Oct. 22, 2013

(54) ELECTROPHOTOGRAPHIC IMAGE FORMING APPARATUS THAT SELECTS A SCREEN FROM A PLURALITY OF SCREENS BASED ON DISTANCE BETWEEN TONER ADHESION OR NON-ADHESION REGIONS

(75) Inventors: Naotoshi Kawai, Toyokawa (JP); Tomohiro Kato, Okazaki (JP); Eri Kusano, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 210 days.

(21) Appl. No.: 13/241,853

(22) Filed: Sep. 23, 2011

(65) Prior Publication Data

US 2012/0086954 A1 Apr. 12, 2012

(30) Foreign Application Priority Data

Oct. 7, 2010 (JP) ................................ 2010-227641

(51) Int. Cl.

*H04N 1/405* (2006.01)
*H04N 1/52* (2006.01)
*H04N 1/29* (2006.01)
*G06K 15/14* (2006.01)

(52) U.S. Cl.

USPC .......... 358/3.06; 358/3.21; 358/536; 358/300

(58) Field of Classification Search

USPC ............... 358/1.9, 3.06, 3.07, 3.12–3.2, 3.21, 358/534–536, 300; 347/131, 240, 251–254; 399/180, 181

See application file for complete search history.

(56) References Cited

U.S. PATENT DOCUMENTS 4,903,123 A 2/1990 Kawamura et al.
6,606,168 B1 8/2003 Rylander
6,714,225 B2 * 3/2004 Mutou et al. ................ 358/3.06
2003/0122917 A1 7/2003 Mutou et al.

(Continued)

FOREIGN PATENT DOCUMENTS

JP 63-307954 A 12/1988
JP 5-161013 A 6/1993

(Continued)

OTHER PUBLICATIONS

Office Action (Notice of Grounds of Rejection) dated Aug. 7, 2012, issued in corresponding Japanese Patent Application No. 2010-227641, and an English Translation thereof. (5 pages).

*Primary Examiner* — Scott A Rogers

(74) *Attorney, Agent, or Firm* — Buchanan Ingersoll & Rooney PC

(57) ABSTRACT

An image forming apparatus selects a screen from a plurality of screens corresponding respectively to a plurality of gradation values and each including a pattern in which a first region to which toner is to adhere and a second region to which toner is not to adhere are defined, and forms a toner image on media. The apparatus includes a storage device for storing a minimum formable distance between first regions or second regions adjacent to each other, and a controller calculating a distance between the first regions or second regions adjacent to each other in the screen and, when the distance of the region of a screen that corresponds to a gradation value of an input image and has a first pattern is smaller than the minimum formable distance, selecting a screen corresponding to the gradation value of the input image and having a second pattern.

16 Claims, 14 Drawing Sheets

(56) References Cited

U.S. PATENT DOCUMENTS

| | | | | |
|---|---|---|---|---|
| 2003/0210431 | A1 | 11/2003 | Rylander | |
| 2006/0290731 | A1* | 12/2006 | Ishii et al. | 347/15 |
| 2011/0249277 | A1* | 10/2011 | Kato et al. | 358/1.1 |

FOREIGN PATENT DOCUMENTS

| | | | |
|---|---|---|---|
| JP | 5-328112 | A | 12/1993 |
| JP | 2002-540735 | A | 11/2002 |
| JP | 2003-054026 | A | 2/2003 |

* cited by examiner

FIG.12

| LINE TYPE | THICKNESS [μm] | ENVIRONMENT | | | AMOUNT OF CHARGE GIVEN TO TONER | | | STATUS OF APPARATUS | |
|---|---|---|---|---|---|---|---|---|---|
| | | LOW TEMPERATURE •LOW HUMIDITY | NORMAL | HIGH TEMPERATURE •HIGH HUMIDITY | SMALL | NORMAL | LARGE | NEW | HAVING LASTED |
| BLACK THIN LINE | 10 | NG | NG | NG | NG | NG | NG | NG | NG |
| | 20 | NG | OK | NG | NG | OK | NG | OK | NG |
| | 30 | NG | OK | OK | OK | OK | NG | OK | OK |
| | 40 | OK | OK | OK | OK | OK | OK | OK | OK |
| | 50 | OK | OK | OK | OK | OK | OK | OK | OK |
| | 60 | OK | OK | OK | OK | OK | OK | OK | OK |
| | 70 | OK | OK | OK | OK | OK | OK | OK | OK |
| | 80 | OK | OK | OK | OK | OK | OK | OK | OK |
| WHITE THIN LINE | 10 | NG | NG | NG | NG | NG | NG | NG | NG |
| | 20 | NG | NG | NG | NG | NG | NG | NG | NG |
| | 30 | NG | NG | NG | NG | NG | OK | OK | NG |
| | 40 | OK | OK | NG | NG | OK | OK | OK | NG |
| | 50 | OK | OK | OK | OK | OK | OK | OK | OK |
| | 60 | OK | OK | OK | OK | OK | OK | OK | OK |
| | 70 | OK | OK | OK | OK | OK | OK | OK | OK |
| | 80 | OK | OK | OK | OK | OK | OK | OK | OK |

ELECTROPHOTOGRAPHIC IMAGE FORMING APPARATUS THAT SELECTS A SCREEN FROM A PLURALITY OF SCREENS BASED ON DISTANCE BETWEEN TONER ADHESION OR NON-ADHESION REGIONS

This application is based on Japanese Patent Application No. 2010-227641 filed with the Japan Patent Office on Oct. 7, 2010, the entire content of which is hereby incorporated by reference.

BACKGROUND OF THE INVENTION

1. Field of the Invention

The present invention relates to an electrophotographic image forming apparatus, particularly to improvement of a technology of more stably reproducing intermediate gradation.

2. Description of the Related Art

Conventionally, electrophotography is adopted as a process of forming an image on a paper medium in an image forming apparatus such as a copying machine, a printer, a facsimile, and a multifunction peripheral. In the electrophotography, an electrostatic latent image is formed on a photosensitive body (typically, a photosensitive drum or a photosensitive belt) using an exposure device, and the image is formed by developing the electrostatic latent image.

Recently, high resolution of the electrophotography makes progress. For example, the exposing device has been improved to enhance the resolution of the electrostatic latent image to 2400 dpi (dots per inch).

On the other hand, a demand for improving process stability also arises with the improvement of the resolution. Because it is said that the improvement of the resolution is contradictory to the process stability, there is an important technical problem in that the stability is maintained while the resolution is enhanced. The process stability affects the finish of intermediate gradation.

Regarding a technique for achieving the process stability, Japanese Laid-Open Patent Publication No. 05-161013 for example discloses a digital recording apparatus that detects with a sensor a pattern in which a high density and a low density are repeated and modulates the density of image data in order to keep the stability of the image quality.

Further, Japanese Laid-Open Patent Publication No. 05-328112 discloses a dither process method in which the image having gradation can be restored by performing dither process corresponding to a density state of the image around each pixel constituting a gray scale image even if the target gray scale image has a deviation of the density.

Generally, in the electrophotographic image forming apparatus, the intermediate gradation is reproduced using a halftone technique. In the halftone technique, an objective gradation value is reproduced by controlling a coloring amount (typically, toner adhesion amount) per unit area using a pattern including small dots (dot pattern) or lines (line pattern). In the control of the coloring amount per unit area, plural screens are previously prepared while correlated with plural gradation values, and the screen is selected according to the density to be reproduced. In the general screen, “adhesion regions” that should be colored and “non-adhesion regions” that should not be colored are regularly disposed at a predetermined period.

Electrophotography, however, is not adequately able to form an image of extremely thin lines or small gaps due to its characteristics as shown in FIGS. 8 and 9. It is therefore said that an increased number of lines within a screen with the purpose of improving the resolution will result in deteriorated image stability.

FIGS. 8 and 9 schematically illustrate states in which the image reproducibility is degraded in the electrophotography. FIGS. 8 and 9 are sectional views schematically illustrating media to which the toner image is fixed. However, the size of media is not matched with the actual size.

As illustrated in FIG. 8, it is considered that a linear toner image has a predetermined width in the main-scanning direction or the sub-scanning direction. When the latent image used to form the toner image has a certain level of width, because the electric field between the latent image and the development roller is maintained in a constant direction even if wraparound of a line of electric force is generated by an edge effect, the toner image is stably formed to some extent. Therefore, the stable development can be performed during the development of the charged toner. On the other hand, when the latent image has the small width, the wraparound of the line of electric force becomes prominent by the edge effect on the development region, and the direction of the electric field tends to become instable. Therefore, it is difficult that the toner stably adheres to the narrow region. In the fixing, when the toner image has the large width to some extent, because unification of the toner is generated, the toner is stably fixed to media. On the other hand, for the thin toner image, occasionally the toner cannot stably be fixed to media due to diffusion of the toner. In such cases, the line looks like the state in which the line is cut, or the line cannot be reproduced at all.

As illustrated in FIG. 9, it is considered that the toner image has a gap (where the toner should not exists) having a predetermined width in the main-scanning direction or the sub-scanning direction. When the gap of the toner has a certain level of width, the gap can be maintained even if the gap is affected by the adjacent toner. On the other hand, for the narrow gap, occasionally the gap is filled by the diffusion of the adjacent toner.

FIG. 10 is an image formed actually by electrophotography from image data in which thin lines and whitened lines have different thicknesses. From the left side toward the right side, the thin lines and whitened lines increase in thickness. It is seen from this drawing that electrophotography is not adequately able to express extremely thin lines or small gaps.

Thus, even if an image forming apparatus has an exposing device with which a latent image of a resolution of 2400 dpi can be formed, formation of a latent image of the resolution of 2400 dpi is actually restricted to characters, and a halftone portion representing intermediate gradation is expressed with the number of screen lines substantially identical to that of a machine with a resolution of 600 dpi, to thereby prevent deterioration of the image stability.

Regarding the above-described method, while the reproducibility of characters is improved when the resolution of the image forming apparatus is enhanced to 2400 dpi, the number of screen lines of the halftone portion representing intermediate gradation is still identical to that in the case of the conventional resolution of 600 dpi. Namely, even if the resolution of the apparatus itself is enhanced, the number of screen lines of a halftone portion is still difficult to increase.

SUMMARY OF THE INVENTION

The present invention has been made in consideration of the problems above, and an object of the present invention is to provide an electrophotographic image forming apparatus capable of improving the resolution and also improving the reproducibility of intermediate gradation.

In order to achieve the object above, according to an aspect of the present invention, an electrophotographic image forming apparatus selects a screen from a plurality of screens corresponding respectively to a plurality of gradation values to form a toner image on media. The plurality of screens each include a pattern in which a first region to which toner is to adhere and a second region to which toner is not to adhere are defined. The image forming apparatus includes a storage device, an image forming unit, and a controller. The storage device includes a storage area for storing a minimum formable distance between first regions adjacent to each other or second regions adjacent to each other. The controller performs: a process of calculating a distance between the first regions adjacent to each other or second regions adjacent to each other of the screen; a process, when a distance between the first regions adjacent to each other or second regions adjacent to each other of the screen of the plurality of screens that corresponds to a gradation value of an input image and has a first pattern is smaller than the minimum formable distance, of switching screen pattern to a second pattern different from the first pattern, and selecting from the plurality of screens a screen corresponding to the gradation value of the input image and having the second pattern; and a process of causing the image forming unit to perform image formation using the selected screen.

Preferably, one of the first pattern and the second pattern is a dot pattern and the other is a line pattern.

Preferably, in the storage area, a first minimum value associated with reproduction of white thin line and a second minimum value associated with reproduction of black thin line are stored each as the minimum formable distance.

Preferably, in the process of selecting, the controller selects, as a screen after the pattern is switched, a screen having the second pattern, so that a distance between the first regions adjacent to each other of a high gradation value after or before the screen pattern is switched is greater than that of a low gradation value before or after the screen pattern is switched.

Preferably, when priority is given to reproducibility of white thin line rather than reproducibility of black thin line, the controller performs the process of calculating to calculate a distance between the second regions adjacent to each other of the screen, and the controller performs the process of selecting to use the second pattern as screen pattern, when the distance between the second regions adjacent to each other of a screen that is one of the plurality of screens and corresponds to a gradation value of an input image is smaller than the minimum formable distance.

More preferably, when a minimum value of the distance between the second regions adjacent to each other of the screen having a dot pattern selected in the process of selecting decreases to reach the minimum formable distance, as the gradation value of the input image increases, the controller performs the process of selecting to use a line pattern as screen pattern and select from the plurality of screens a screen corresponding to the gradation value of the input image and having the line pattern.

More preferably, when a minimum value of the distance between the second regions adjacent to each other of the screen having a line pattern selected in the process of selecting decreases to reach the minimum formable distance, as the gradation value of the input image increases, the controller performs the process of selecting to use a dot pattern as screen pattern and select from the plurality of screens a screen corresponding to the gradation value of the input image and having the dot pattern.

Preferably, when priority is given to reproducibility of black thin line rather than reproducibility of white thin line, the controller performs the process of calculating to calculate a distance between the first regions adjacent to each other of the screen, and the controller performs the process of selecting to use the second pattern as screen pattern, when the distance between the first regions adjacent to each other of the screen that is one of the plurality of screens and corresponds to a gradation value of an input image is smaller than the minimum formable distance.

More preferably, when a minimum value of the distance between the first regions adjacent to each other of the screen having a dot pattern selected in the process of selecting decreases to reach the minimum formable distance, as the gradation value of the input image decreases, the controller performs the process of selecting to use a line pattern as screen pattern and select from the plurality of screens a screen corresponding to the gradation value of the input image and having the line pattern.

More preferably, when a minimum value of the distance between the first regions adjacent to each other of the screen having a line pattern selected in the process of selecting decreases to reach the minimum formable distance, as the gradation value of the input image decreases, the controller performs the process of selecting to use a dot pattern as screen pattern and select from the plurality of screens a screen corresponding to the gradation value of the input image and having the dot pattern.

Preferably, in the process of selecting, the controller uses, as a threshold value, a gradation value corresponding to a screen having a pattern in which the distance between the first regions adjacent to each other or second regions adjacent to each other corresponds to the minimum formable distance, compares the gradation value of the input image with the threshold value to determine a screen pattern, and selects from the plurality of screens a screen corresponding to the gradation value of the input image and having the determined pattern.

Preferably, in the process of selecting, the controller selects from the plurality of screens a screen corresponding to the gradation value of the input image and having the first pattern, uses the second pattern as screen pattern when the distance between the first regions adjacent to each other or second regions adjacent to each other of the selected screen is smaller than the minimum formable distance, and selects from the plurality of screens a screen corresponding to the gradation value of the input image and having the second pattern.

Preferably, in the storage area, the minimum formable distance is stored for each condition that influences reproducibility, and the controller further performs a process of obtaining a condition that influences reproducibility and identifying the minimum formable distance associated with the condition.

More preferably, in the storage area, the minimum formable distance is stored for each screen angle, and the controller performs the process of identifying to identify the minimum formable distance associated with the obtained condition that influences reproducibility and with the screen angle.

According to another aspect of the present invention, an electrophotographic image forming method selects a screen from a plurality of screens corresponding respectively to a plurality of gradation values to form a toner image on media.

The plurality of screens each include a pattern in which a first region to which toner is to adhere and a second region to which toner is not to adhere are defined. The image forming method includes the steps of: reading from a storage device a minimum formable distance between first regions adjacent to each other or second regions adjacent to each other, the minimum formable distance being formable by the image forming apparatus associated with the condition; calculating a width of a thin line of the screen; when the distance between the first regions adjacent to each other or second regions adjacent to each other of a screen that is one of the plurality of screens, corresponds to a gradation value of an input image, and has a first pattern, is smaller than the minimum formable distance, switching screen pattern to a second pattern different from the first pattern, and selecting from the plurality of screens a screen corresponding to the gradation value of the input image and having the second pattern; and performing image formation using the selected screen.

According to still another aspect of the present invention, a recording medium is a computer-readable recording medium on which a program is recorded for causing an image forming apparatus to perform an image forming process based on electrophotography selecting a screen from a plurality of screens corresponding respectively to a plurality of gradation values to form a toner image on media. The plurality of screens each include a pattern in which a first region to which toner is to adhere and a second region to which toner is not to adhere are defined. The program causes the image forming apparatus to perform the steps of: reading from a storage device a minimum formable distance between first regions adjacent to each other or second regions adjacent to each other, the minimum formable distance being formable by the image forming apparatus associated with the condition; calculating a width of a thin line of the screen; when the distance between the first regions adjacent to each other or second regions adjacent to each other of a screen that is one of the plurality of screens, corresponds to a gradation value of an input image, and has a first pattern, is smaller than the minimum formable distance, switching screen pattern to a second pattern different from the first pattern, and selecting from the plurality of screens a screen corresponding to the gradation value of the input image and having the second pattern; and performing image formation using the selected screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram showing the results of inventors' examination of the thickness that can be reproduced with stability by an image forming apparatus.

DESCRIPTION OF THE PREFERRED EMBODIMENTS

Figure 1:
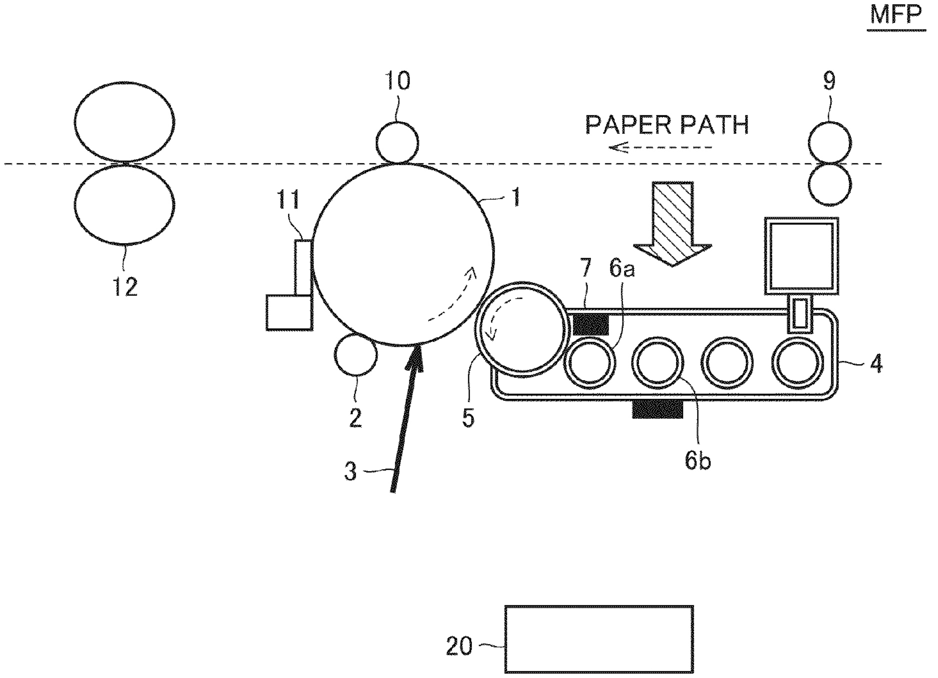
FIG. 1 is a schematic configuration diagram of an image forming apparatus according to an embodiment.

With reference to the drawings, an embodiment of the present invention will hereinafter be described. In the following description, the same parts and the same components are denoted by the same reference characters. They are named and function identically as well.

<Configuration of Image Forming Apparatus>

The present invention can be applied to any electrophotographic image forming apparatus. Specifically, for example, the invention is applied to a copying machine, a laser printer, a facsimile, a multi-functional peripheral, and the like. The following description will be of a typical example of the image forming apparatus of the present invention, specifically a multi-functional peripheral having multiple functions such as copy function, print function, facsimile function, and scanner function. While the following example is of a monochrome multi-functional peripheral, the image forming apparatus for the present invention is not limited to the monochrome machine, and may also be a color machine of two or more colors, or a full-color machine in which toners of four or more colors are provided in advance.

FIG. 1 is a schematic configuration diagram of an image forming apparatus MFP according to an embodiment of the present invention. Referring to FIG. 1, image forming apparatus MFP includes: a photoconductor 1 which serves as an image holder and is rotationally driven in the direction indicated by the arrow-headed dashed line in the drawing; a charging roller 2 provided at a position opposite to photoconductor 1 for uniformly charging photoconductor 1; a developing device 4 including a developing roller 5 provided at a position opposite to photoconductor 1 and located downstream in the rotational direction relative to charging roller 2; a transfer roller 10 serving as a transferring unit which is provided at a position opposite to photoconductor 1 and located downstream in the rotational direction relative to developing roller 5, a transport path (paper path) of a recording material being located between transfer roller 10 and photoconductor 1; a fixing unit 12 provided at a position downstream (in the transport direction) relative to the position of photoconductor 1 and transfer roller 10 on the transport path of the recording material, for applying heat and pressure to fix the transported recording material; and a control unit 20 for controlling these components.

Image forming apparatus MFP further includes an exposing unit (not shown). As the exposing unit, a laser, an LED (Light Emitting Diode) or the like may be used. The exposing unit is placed at a position and an angle that allow the section of photoconductor 1 from the position opposite to charging roller 2 to the position opposite to the developing roller 5 in the rotational direction to be illuminated with exposure light 3 from the exposing unit.

Control unit 20 outputs a control signal to the exposing unit based on image data to be processed, so as to cause the exposing unit to emit exposure light 3 toward photoconductor 1. Exposure light 3 from the exposing unit illuminates the surface of photoconductor 1 that has been uniformly charged by charging roller 2. On photoconductor 1, an electrostatic latent image is formed by exposure light 3 from the exposing unit.

Developing device 4 is placed at a position in close proximity to photoconductor 1, and stores therein a dual-component developer made up of toner and carrier. Developing device 4 has therein a feed screw 6*a*, a stir screw 6*b*, and a regulation member 7.

Stir screw 6*b* stirs the toner and carrier in developing device 4 to thereby frictionally charge the developer. Feed screw 6*a* feeds the frictionally charged developer to developing roller 5. Regulation member 7 regulates the amount of the developer to be transported to developing roller 5 to thereby regulate the developer to be supplied to developing roller 5.

Developing roller 5 is rotationally driven in the direction indicated by the arrow-headed dashed line in the drawing and at the position where the developing roller contacts photoconductor 1. Rotation of developing roller 5 causes the developer fed to developing roller 5 to be transported to a development region which is closest to photoconductor 1. Subsequently, an electric field between developing roller 5 and the electrostatic latent image on photoconductor 1, formed by a voltage applied to developing roller 5, causes the developer to move from the developing roller to photoconductor 1 and develops the electrostatic latent image on photoconductor 1 into a visible image (toner image). The developer that is left on developing roller 5 without being transported to the development region to give no contribution to development is peeled off by a peeling pole and collected into developing device 4.

Image forming apparatus MFP has a paper feed unit for feeding a recording material (not shown). Timing rollers 9 transport the recording material fed from the paper feed unit to a transfer region between photoconductor 1 and transfer roller 10 at the timing that allows the recording material to meet the top of the image on photoconductor 1. The toner image formed on photoconductor 1 is peeled off from photoconductor 1 and transferred onto the recording material by transfer roller 10. The recording material holding the toner image is transported to fixing unit 12 where heat and pressure are applied to fix the toner image on the recording material. The toner left on photoconductor 1 after the image is transferred is scraped off from photoconductor 1 by a cleaning blade 11.

It is noted that the image holder may not be the roller-shaped photoconductor as shown, but instead be a belt-shaped photoconductor. Likewise, the charging unit may not be the roller charger, but instead be a corona discharge charger, or a charger of another type such as blade, brush, or proximity charging member. In this case, the voltage is applied by means of a grid mesh, blade, brush, or the like.

Further, the developing device may not be based on the dual-component developing method as shown, but be based on a single-component or hybrid developing method.

Furthermore, the transferring unit may not be based on the transfer method using the transfer roller, but instead use a transfer charger, transfer belt or the like. The transferring unit may not be based on the direct transfer method that directly transfers the toner image from the photoconductor to the recording material, but instead be based on a method that performs transfer in two or more steps using intermediate transfer units such as transfer roller, transfer belt or the like arranged between the photoconductor and the recording material.

The cleaning method may not be the method using the cleaning blade, but instead be a method using a cleaning brush or cleaning roller or a complex cleaning method using a combination of them. Alternatively, the cleaning mechanism may be omitted and a cleaner-less method may be used that collects the toner left after the transfer process by the developing unit.

The fixing method of the fixing device may not be the fixing method using fixing rollers, but instead be a fixing method using a fixing belt or the like or a non-contact fixing method.

Further, in the case where image forming apparatus MFP is a color machine of two or more colors or a full-color machine in which toners of four or more colors are provided in advance, the configuration of image forming apparatus MFP is largely identical to that shown in FIG. 1, except that it is a tandem machine in which four photoconductors are arranged, or a four-cycle machine in which one photoconductor is arranged and a plurality of developing devices are arranged to switch the development color.

<Reproduction of Intermediate Gradation>

Intermediate gradation reproducing processing in the electrophotographic image forming process will be described below. As described above, in the electrophotographic image forming process, the surface of the evenly-charged photosensitive body exposed with the laser beam according to the image that should be reproduced, the electrostatic latent image is formed on the photosensitive body, and the formed electrostatic latent image is developed as the toner imaged by the development unit. That is, in the electrophotography, only whether the toner image should be formed is controlled in the portion on the surface of the photosensitive body, a coloring amount (that is, toner adhesion amount) of the portion cannot continuously be controlled. Therefore, the intermediate gradation in the electrophotography is reproduced by controlling a ratio (hereinafter also referred to as an “area ratio”) of an area to which the toner should adhere per unit area using a halftone technique. That is, the intermediate gradation is reproduced by controlling an exposure amount per unit area by the exposure device according to an exposure pattern including a small point or line. Because so-called Pulse Width Modulation (PWM) in which on/off time of the light used in the exposure is controlled is generally adopted in the exposure device, a configuration in which the exposure device of the pulse width modulation is used will be described in the embodiment. In the pulse width modulation, a ratio of light emitting time is relatively shortened with respect to the portion having the low image density (low gradation value), and the ratio of the light emitting time is relatively lengthened with respect to the portion having the high image density (high gradation value).

More specifically, in image forming apparatus MFP according to the embodiment, the intermediate gradation is reproduced using a so-called screen technology. The screen technology generates a plurality of dot images (screens) associated respectively with a plurality of gradation values, and controls an exposure pattern for the surface of the photoconductor in accordance with the screens for each unit region having the intermediate gradation included in the input image. In other words, image forming apparatus MFP according to the present embodiment generates screens corresponding respectively to a plurality of gradation values and forms a toner image on media in accordance with the patterns represented by the screens. In order to reproduce a photograph with high accuracy, it is necessary to be able to reproduce many gradation values, and therefore, screens representing patterns corresponding to gradation values that become objects are generated. As such patterns, “dot pattern” or “line pattern” is commonly used.

Figure 2:
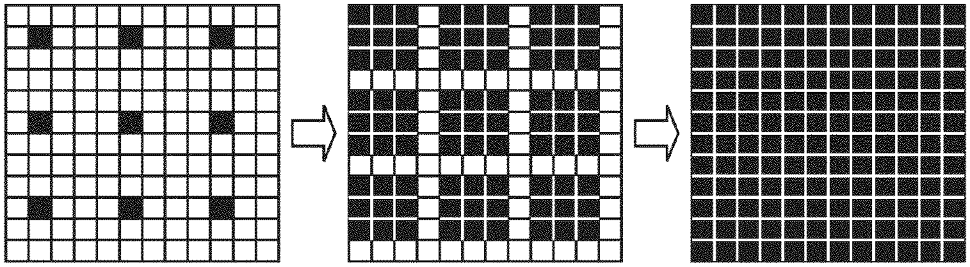
FIGS. 2 and 3 are each a diagram showing an example of the arrangement pattern of a dot screen.
Figure 3:
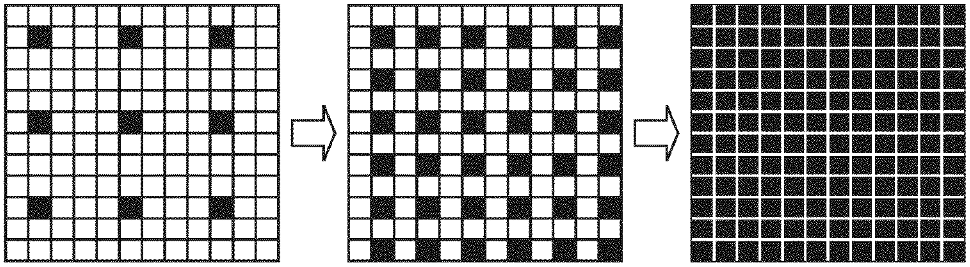
Figure 4:
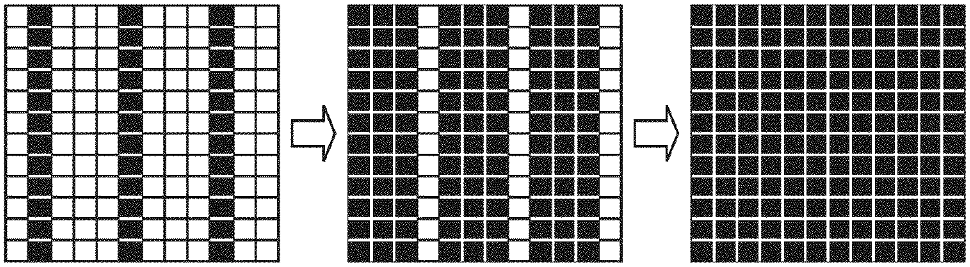
FIGS. 4 and 5 are each a diagram showing an example of the arrangement pattern of a line screen.
Figure 5:
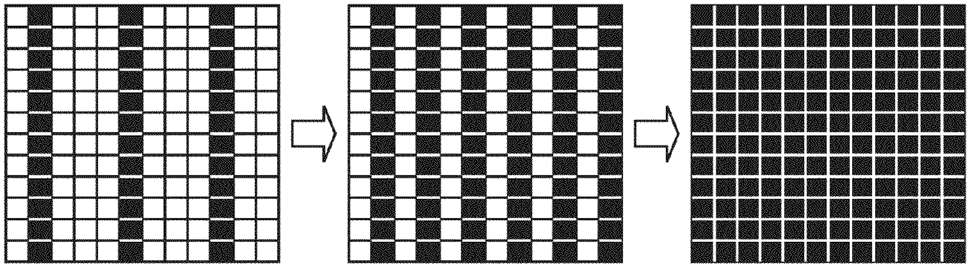

FIGS. 2 and 3 illustrate examples of a layout pattern in the dot screen, and FIGS. 4 and 5 illustrate examples of a layout pattern in the line screen. As illustrated in FIGS. 2 to 5, each screen has a binarized pattern defined by a “first region (toner adhesion region)” and a “second region (toner non-adhesion region)”. The “first region (toner adhesion region)” is a region that should be colored (toner should adhere to). The “second region (toner non-adhesion region)” is a region that should not be colored (toner should not adhere to). In FIGS. 2 to 5, the first region (toner adhesion region) is expressed by “black”, and the second region (toner non-adhesion region) is expressed by “white”. The similar expression method is adopted in the following drawings.

As illustrated in FIGS. 2 to 5, each of the plural screens includes a pattern in which the first region (or toner adhesion region) including pixels that is a toner adhesion control target and the second region (or toner non-adhesion region) including pixels that are not the toner adhesion control target are defined. The “first region” corresponds to a pixel or a pixel aggregate that is a control target in order to cause the toner to adhere, and the “second region” corresponds to a region except the “first region”, that is, a pixel or a pixel aggregate that is not the control target in order to cause the toner to adhere.

Hereinafter, the first region (or toner adhesion region) is simply referred to as an “adhesion region”, and the second region (or toner non-adhesion region) is simply referred to as a “non-adhesion region”.

As illustrated in FIGS. 2 and 3, typically the “dot screen” has the pattern in which the adhesion regions are disposed into a matrix shape while the regions except the adhesion regions are disposed as the non-adhesion region. On the other hand, as illustrated in FIGS. 4 and 5, the “line screen” has the pattern in which the linear adhesion regions and non-adhesion regions extending in a predetermined direction are alternately disposed.

At this point, in order to reproduce the dense image having little granularity (surface roughness) in the print result, preferably a spatial frequency is not largely changed by screen switching. Therefore, when the gradation value of the density reproduced in the dot screen is increased, a method in which other dots are collected by additionally disposing other dots around the original dot as illustrated in FIG. 2 or a method in which the number of disposed dots is increased by dispersing the dots as illustrated in FIG. 3 is adopted. The dot screen has the pattern change in which the adhesion region expands according to a predetermined rule (the expansion of the dot aggregation or the increase in the number of dispersed dots) in association with the increase of the gradation value.

When the gradation value of the density reproduced in the line screen is increased, a method in which a line width of an original line is widened while a center position of the original line is maintained as illustrated in FIG. 4 or a method in which the number of disposed lines is increased by dispersing the lines as illustrated in FIG. 5 is adopted. The line screen has the pattern change in which the adhesion region expands according to a predetermined rule (the expansion of the line width or the increase in the number of disposed lines dispersed) in association with the increase of the gradation value.

Figure 6:
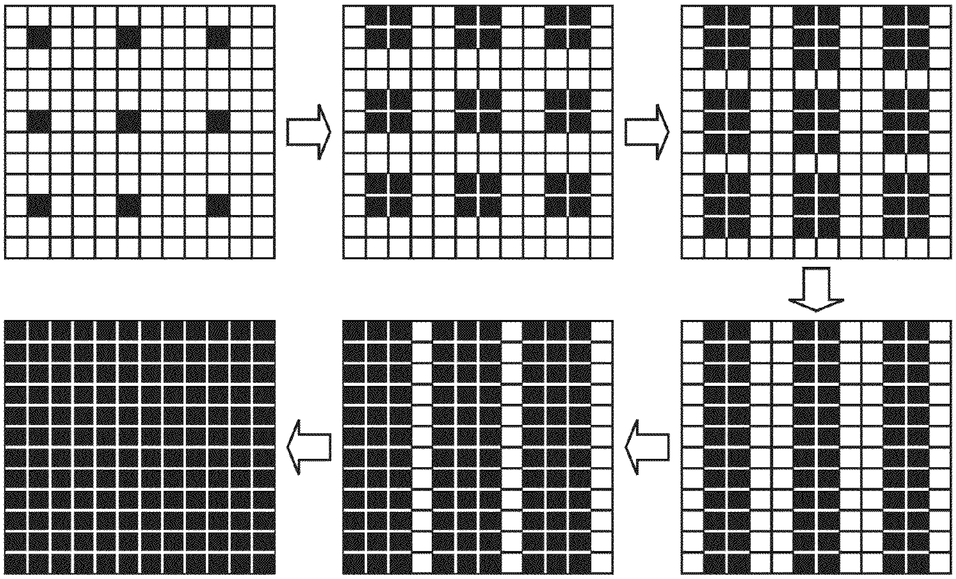
FIGS. 6 and 7 are each a diagram showing an example of the arrangement pattern of a composite screen group made up of dot and line screens.
Figure 7:
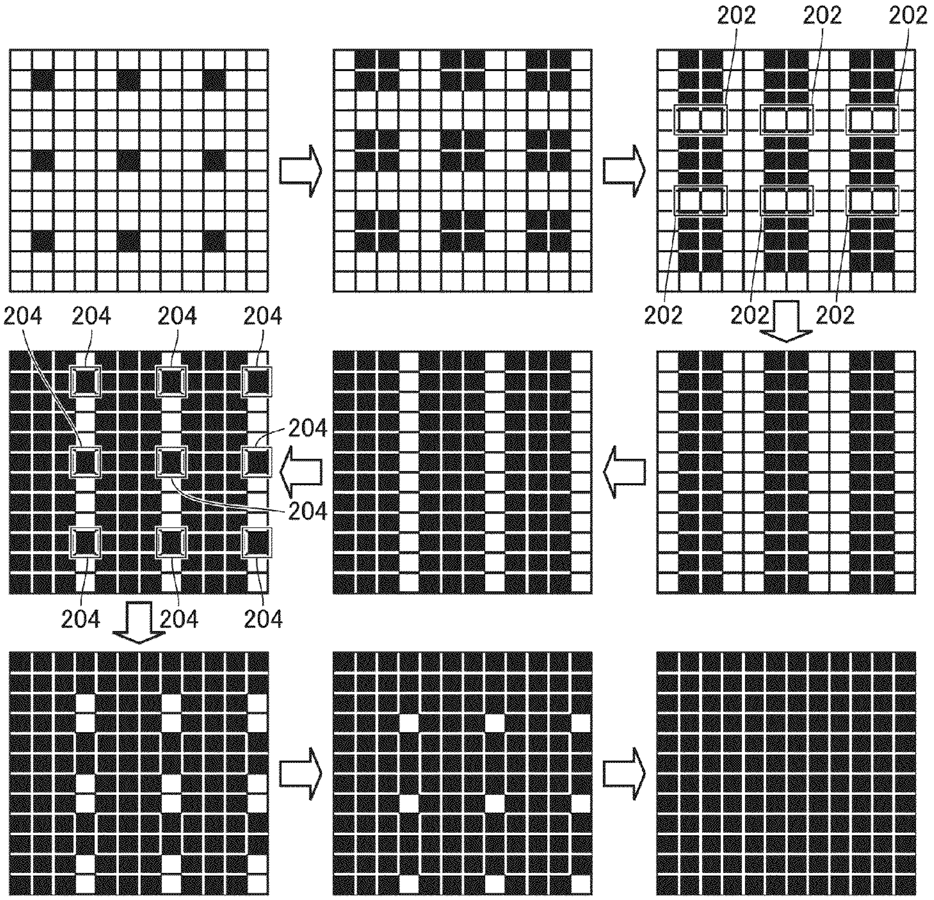

A screen group in which the dot screen and the line screen are composite is occasionally adopted. FIGS. 6 and 7 illustrate examples of a layout pattern in a composite screen group of the dot screen and the line screen.

FIG. 6 illustrates an example of the screen group, in which the pattern change similar to that of the dot screen of FIG. 2 is illustrated on a low gradation side while the pattern change similar to that of the line screen of FIG. 4 is illustrated on a high gradation side. That is, in the screen group of FIG. 6, on the low gradation side, a dot diameter gradually increases with increasing gradation value of the density, and the line width gradually expands with further increasing gradation value after the number of dots exceeds a certain area ratio (that is, after the adjacent dots are joined to each other).

FIG. 7 illustrates a screen group in which gradation reproducibility on the high gradation side is enhanced compared with the screen group of FIG. 6. That is, in the screen group of FIG. 7, when the gradation value that should be reproduced is relatively low, the dot diameter gradually expands with increasing gradation value of the density, and the whole line width gradually increases with further increasing gradation value after the number of dots exceeds a certain area ratio. When the line width exceeds a predetermined value, only the width in part of the line gradually expands.

<Image Reproducibility in Electrophotography>

As described above, the electrophotography is not good at the reproduction of the extremely thin line or small gap, because the electrostatic latent image is developed into the toner image.

Figure 8:
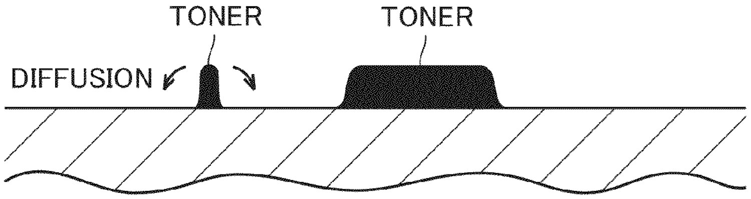
FIGS. 8 and 9 are each a diagram schematically showing a state where the image reproducibility of electrophotography is deteriorated.
Figure 9:
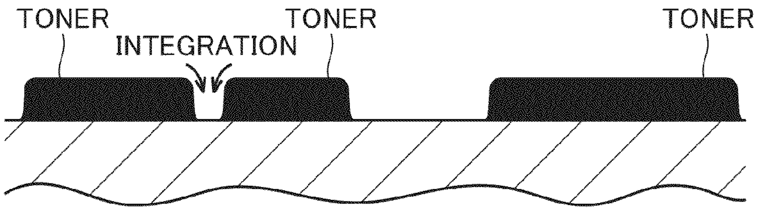

FIGS. 8 and 9 schematically illustrate states in which the image reproducibility is degraded in the electrophotography. FIGS. 8 and 9 are sectional views schematically illustrating media to which the toner image is fixed. However, the size of media is not matched with the actual size.

As illustrated in FIG. 8, it is considered that a linear toner image has a predetermined width in the main-scanning direction or the sub-scanning direction. When the latent image used to form the toner image has a certain level of width, because the electric field between the latent image and the development roller is maintained in a constant direction even if wraparound of a line of electric force is generated by an edge effect, the toner image is stably formed to some extent. Therefore, the stable development can be performed during the development of the charged toner. On the other hand, when the latent image has the small width, the wraparound of the line of electric force becomes prominent by the edge effect on the development region, and the direction of the electric field tends to become instable. Therefore, it is difficult that the toner stably adheres to the narrow region. In the fixing, when the toner image has the large width to some extent, because unification of the toner is generated, the toner is stably fixed to media. On the other hand, for the thin toner image, occasionally the toner cannot stably be fixed to media due to diffusion of the toner. In such cases, the line looks like the state in which the line is cut, or the line cannot be reproduced at all.

As illustrated in FIG. 9, it is considered that the toner image has a gap (where the toner should not exists) having a predetermined width in the main-scanning direction or the sub-scanning direction. When the gap of the toner has a certain level of width, the gap can be maintained even if the gap is affected by the adjacent toner. On the other hand, for the narrow gap, occasionally the gap is filled by the diffusion of the adjacent toner.

Figure 10:
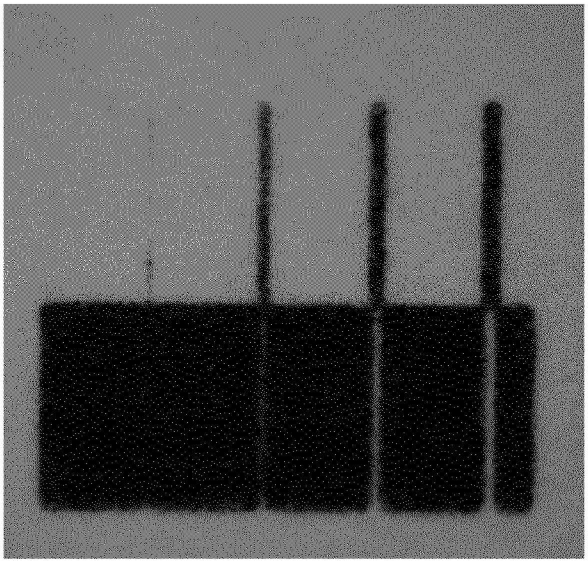
FIG. 10 is an image formed actually by electrophotography from image data in which thin lines and whitened lines have different thicknesses.

FIG. 10 is an image formed actually by electrophotography from image data in which thin lines and whitened lines have different thicknesses. From the left side toward the right side, the thin lines and whitened lines increase in thickness. It is seen from this drawing that electrophotography is not good at the reproduction of the extremely thin lines or small gaps.

In the electrophotography, the reproducibility is possibly degraded for the pattern having the narrow width to which the toner adheres and the pattern having the narrow width to which the toner does not adhere. Accordingly, in the screen group used in the intermediate gradation reproducing processing, preferably both the adhesion region and the non-adhesion region are not narrowed as much as possible.

In the screen groups of FIGS. 2 to 5, the reproduced gradation value is changed by monotonously increasing the area ratio based on the basic shape of the dot or line. Therefore, it is found that the adhesion region and/or the non-adhesion region having only one-pixel width exist in a certain gradation value.

In the screen group of FIG. 6, the dot diameter expands on the low gradation side in the form similar to the dot screen, and the line width expands on the high gradation side in the form similar to the line screen, so that the degradation of the image reproducibility can be suppressed compared with the screens of FIGS. 2 to 5. In the screen of FIG. 7, a length of the non-adhesion region is shortened on the high gradation side while the width of the non-adhesion region is maintained, so that the degradation of the image reproducibility can be suppressed on the high gradation side compared with the screen of FIG. 6.

<Screens of the Present Embodiment>

In the plural screens (hereinafter also referred to as a "screen set") that image forming apparatus MFP according to the embodiment uses in the intermediate gradation reproducing processing, compared with the screen group of FIGS. 6 and 7, the intermediate gradation is more stably reproduced by avoiding the narrowed width of the adhesion region and/or the non-adhesion region.

Figure 11:
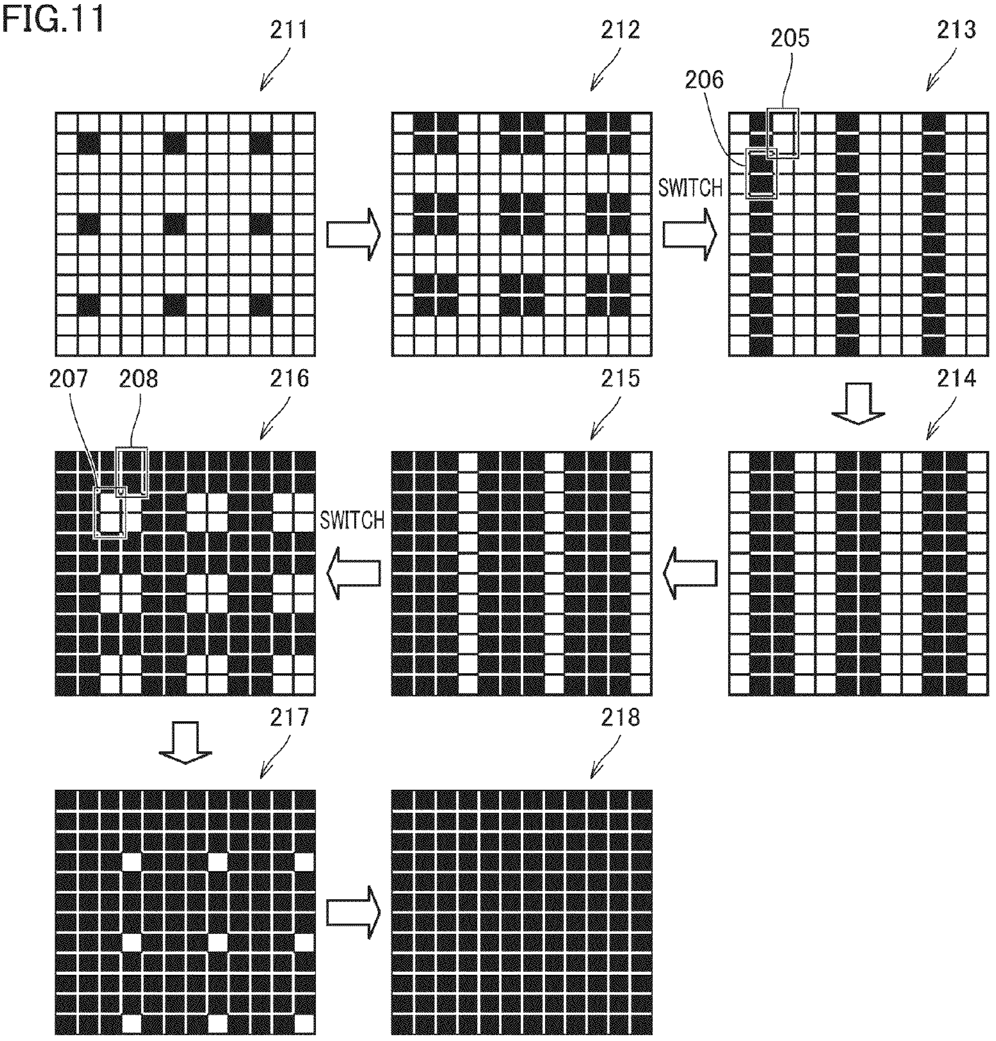
FIG. 11 is a diagram showing an example of pattern variations of a screen set according to the embodiment of the present invention.

FIG. 11 illustrates an example of a pattern change in the screen set according to the embodiment of the invention. For the sake of convenience, FIG. 11 illustrates the screens that can be compared to the screens of FIGS. 2 to 7. However, the screens of invention are not limited to the screens of FIG. 11.

In the screen groups of FIGS. 6 and 7, the patter including the adhesion region and/or the non-adhesion region having the narrow width is reduced compared with the screen groups of FIGS. 2 to 5. However, when the non-adhesion regions having the narrow intervals emerge at a certain area ratio, the interval between the non-adhesion regions is not widened even if the non-adhesion regions having the narrow intervals are eliminated.

For example, in the screen group of FIG. 7, the dots adjacent to each other are joined at a stage at which the form similar to the dot screen is changed to the form similar to the line screen. That is, in each dot, the adhesion region expands toward the adjacent dot located on one side of the dot, whereby the line emerges. A gap region 202 having a narrow width is generated between the dots adjacent to each other immediately before the line emerges. Gap region 202 disappears when the dots adjacent to each other are joined. At this point, the width of the non-adhesion region except gap region 202 does not change.

In the screen group of FIG. 7, the dots adjacent to each other are partially joined at a stage at which the form similar to the line screen is changed to the form similar to the dot screen with respect to the non-adhesion region. That is, in each line, the line width partially expands toward the adjacent line located on one side of the line, whereby the dot with respect to the non-adhesion region emerges. A gap region 204 having a narrow width is generated between the lines adjacent to each other immediately before the dot with respect to the non-adhesion region emerges. Gap region 204 disappears by expanding the adhesion region that joins adjacent lines. At this point, the width of the adhesion region except gap region 204 does not change.

On the other hand, in the screen set according to the embodiment, the generation of gap regions 202 and 204 can be prevented without affecting the gradation value of the whole screen. Generally, the screen according to the embodiment largely differs from the screens of FIGS. 2 to 7 in that even the portion that is set in the adhesion region at a certain gradation value is set in the non-adhesion region at a higher gradation value. That is, in the screen of FIGS. 2 to 7, the portion that is set in the adhesion region at a certain gradation value is always set in the adhesion region at the gradation value higher than a certain gradation value. On the other hand, in the screen set according to the embodiment, restrictions of the adhesion region and the non-adhesion region are relaxed to perform the more flexible pattern change.

More specifically, in the screen of FIG. 11, the three screens of the dot screen, the line screen, and an open dot screen are sequentially switched to generate the necessary density change. That is, a pattern 211, a pattern 212, a pattern 213, a pattern 214, a pattern 215, a pattern 216, a pattern 217, and a pattern 218 sequentially change with increasing objective gradation value. Patterns 211 and 212 are the "dot pattern", patterns 213, 214, and 215 are the "line pattern", and patterns 216 and 217 are the "open dot pattern".

As described above, the "dot screen" means the pattern in which the adhesion regions are disposed into the matrix shape while other portions except the adhesion regions are set to the non-adhesion regions. The dot screen has the pattern change in which the adhesion region expands according to the predetermined rule (the expansion of the dot diameter or the increase in the number of dots) in association with the increase in gradation value. The pattern possessed by each screen included in the "dot screen" is also referred to as a "dot pattern".

As described above, the "line screen" means the pattern in which the linear adhesion regions and non-adhesion regions extending in the predetermined direction are alternately disposed. The line screen has the pattern change in which the adhesion region expands according to another independent predetermined rule (the expansion of the line width or the increase in the number of disposed lines) different from the rule of the dot screen in association with the increase in gradation value. The pattern possessed by each screen included in the "line screen" is also referred to as a "line pattern".

The "open dot screen" means the pattern in which the non-adhesion regions are disposed into the matrix shape while other portions except the non-adhesion regions are set to the adhesion regions. The open dot screen has the pattern change in which the non-adhesion region expands according to the predetermined rule (the expansion of the dot diameter or the increase in the number of dots) in association with the decrease in gradation value. The pattern possessed by each screen contained in the "open dot screen" is also referred to as an "open dot pattern".

In FIG. 11, when the dot pattern (pattern 212) is changed to the line pattern (pattern 213) at a specific gradation value in association with the change to the higher gradation value, the line is not generated by expanding the dot illustrated in pattern 212 only in one direction, but the dots partially expand in the direction of the adjacent dot (region 206) while part (region 205) of the dots is changed from the adhesion region to the non-adhesion region. In other words, the adhesion region of region 205 constituting the dot pattern is moved to region 206 to increase the expressed gradation value. The area ratio is kept constant between pattern 212 and pattern 213. This is because the expressed density depends on the screen type (a difference between the dot pattern and the line pattern). That is, even if the screen has the identical area ratio, occasionally one of the screens (in this example, the line pattern) is reproduced with the higher density depending on the value of the area ratio.

The relocation of the adhesion region during switching from the dot pattern to the line pattern can suppress the generation of gap region 202 of FIG. 7 and widen the line width of the non-adhesion region after the switching to the line pattern.

When the line pattern (pattern 215) is switched to the open dot pattern (pattern 216) in association with the change to the higher gradation value, the open dot is not generated by partially expanding the lines illustrated in pattern 215 only in one direction, but the lines partially expand in the direction of the adjacent line (region 208) while part (region 207) of the lines is changed from the adhesion region to the non-adhesion region. In other words, the adhesion region of region 207 constituting the line pattern is moved to region 208 to increase the reproduced gradation value. The area ratio is kept constant between pattern 215 and pattern 216. This is because, as described above, the reproduced gradation value depends on the screen type (the difference between the line pattern and the open dot pattern). The relocation of the adhesion region during switching from the line pattern to the open dot pattern can suppress the generation of gap region 204 of FIG. 7 and maintain the size of two-by-two cell of the open dot. The width of the open dot is larger than that of the non-adhesion region of FIG. 7.

Namely, regarding image forming apparatus MFP according to the present embodiment, in the case where a gradation value to be reproduced for a unit region of an input image is smaller than a first threshold value (an intermediate value between the gradation value reproduced by pattern 212 and the gradation value reproduced by pattern 213 shown in FIG. 11), a screen is selected from a first screen group (typically the series of dot screens as described above). In the case where the gradation value is larger than the first threshold value, a screen is selected from a second screen group (typically the series of line screens as described above). Further, regarding image forming apparatus MFP according to the present embodiment, in the case where the gradation value to be reproduced for a unit region of an input image is larger than a second threshold value (an intermediate value between the gradation value reproduced by pattern 215 and the gradation value reproduced by pattern 216 shown in FIG. 11) which is larger than the first threshold value, a screen is selected from a third screen group (typically the series of open dot screens as described above).

In other words, image forming apparatus MFP according to the present embodiment selects (calculates) a screen (the state of pattern 215 shown in FIG. 11 for example) from the first screen group (typically the series of dot screens as described above) including a plurality of screens having a first pattern defining a first region made up of pixels that is the toner adhesion control target, in order to allow the first region (toner adhesion region) to expand in a predetermined direction as the gradation value to be reproduced increases. Further, when the gradation value to be reproduced reaches a predetermined threshold value, the screen group from which a screen is to be selected is changed from the first screen group to the second screen group (typically the series of open dot screens as described above) including a plurality of screens having a second pattern defining a second region made up of pixels that is not the toner adhesion control target. As a screen for switching thereto, a screen (pattern 216 shown in FIG. 11 for example) is selected (calculated) having a larger width, in a predetermined direction, of the second region in the second pattern than the distance between first regions adjacent to each in the first pattern.

In still other words, image forming apparatus MFP according to the present embodiment holds the first screen group (typically the series of dot screens as described above) including a plurality of screens having the first pattern defining the first region (toner adhesion region) made up of pixels that is the toner adhesion control target, and the second screen group (typically the series of open dot screens as described above) including a plurality of screens having the second pattern defining the second region (toner non-adhesion region) made up of pixels that is not the toner adhesion control target. As the gradation value decreases, a screen (the state of pattern 213 shown in FIG. 11 for example) is selected (calculated) from the second screen group so that the second region expands in a predetermined direction. When the gradation value thereafter reaches a predetermined threshold value, the group of screens from which a screen is to be selected is switched from the second screen group to the first screen group. As a screen for switching thereto, a screen (the state of pattern 212 shown in FIG. 11 for example) is selected (calculated) having a smaller distance, in a predetermined direction, between first regions adjacent to each other in the first pattern than the width of the second region in the second pattern.

In the case where the screen group is switched in the above-described manner, preferably a screen (the state of pattern 212 shown in FIG. 11 for example) selected (calculated) from the first screen group before switching and a screen (the state of pattern 213 shown in FIG. 11 for example) selected (calculated) from the second screen group after switching have substantially identical gradation value.

Preferably the relocation in which the pixels of the toner adhesion control target in the first region are replaced with the pixels that are not the toner adhesion control target in the second region is performed before and after the switching while the identical gradation value is maintained. For example, when the state of pattern 212 is compared to the state of pattern 213 as shown in FIG. 11, it is found that part of the second region (toner non-adhesion region) is replaced with the first region (toner adhesion region) while the number of first regions (toner adhesion region) is maintained. The same holds true between the state of pattern 215 and the state of pattern 216 as shown in FIG. 11.

In the embodiment, the screen switching is performed using the technique in which even the portion that is set in the adhesion region at certain density is set in the non-adhesion region at higher density. Therefore, the narrowed width of the adhesion region and/or the non-adhesion region can be avoided to more stably reproduce the intermediate gradation.

In FIG. 11, with increasing density, the configuration for switching the screen in the order of the dot pattern, the line pattern, and the open dot pattern is illustrated. Alternatively, the configuration for switching the screen only between the dot screen and the line screen may be adopted from the viewpoint of simplification of switching logic.

<Screen Switching>

In order to find the extent of the thickness of extremely thin lines and whitened thin lines that the image forming apparatus MFP is not adequately able to reproduce, the inventors of the present application have used image forming apparatus MFP to form a pattern in which black thin lines and white thin lines having different thicknesses coexist as shown in FIG. 10, and examined the thicknesses that can be reproduced with stability. FIG. 12 is a diagram showing the results of examination by the inventors.

Specifically, the reproducibility of thin lines was examined under environmental conditions for image formation including a "low-temperature and low-humidity" environment in which the temperature and the humidity were approximately 10° C. and 15% respectively, a "normal" environment in which the temperature and the humidity were approximately 23° C. and 65% respectively, and a "high-temperature and high-humidity" environment in which the temperature and the humidity were approximately 30° C. and 85% respectively. As to the conditions of the amount of charge given to the toner, the reproducibility of thin lines was examined under the conditions including a "small" amount of charge of approximately 20 μC/g, a "normal" amount of charge of approximately 30 μC/g, and a "large" amount of charge of approximately 40 μC/g. As to the conditions in terms of the status of use of the apparatus, the reproducibility of thin lines was examined under the conditions including a "new" condition that the apparatus had used only approximately 20% of the total ability to form images, and a "having lasted" condition that the apparatus had used almost all ability to form images. While FIG. 10 shows an example of the pattern in which four black thin lines and four white thin lines coexist, the present examination used a pattern having eight black thin lines and eight white thin lines. The thicknesses shown in FIG. 12 are not the thicknesses of lines of actual output images, but the thicknesses of lines in image data.

From the results of examination shown in FIG. 12, it is seen that the thin-line reproducibility of the image forming apparatus used for the examination varies depending on the conditions such as temperature that influence the thin-line reproducibility, and the characteristics of the reproducibility of black thin lines and the characteristics of the reproducibility of white thin lines are different from each other. Namely, depending on whether priority is given to the reproducibility of white thin lines or the reproducibility of black thin lines when an input image is to be reproduced, the timing at which the screen is switched may be different. Whether priority is given to the reproducibility of black thin lines or the reproducibility of white thin lines may be set in advance, or specified each time an image is to be formed.

Accordingly, image forming apparatus MFP preliminarily stores the characteristics of the reproducibility shown in FIG. 12 and, based on the characteristics which depend on the conditions influencing the reproducibility, identifies a minimum reproducible line width L. When thickness d of thin lines in a screen selected in accordance with a gradation value of a region to be reproduced becomes smaller than the identified minimum reproducible line width L, the dot screen and the line screen are switched to/from each other. In this way, the stable reproducibility of thin lines is ensured.

While this examination varies the conditions of the environment, the amount of charge given to the toner, and the status of use of the apparatus as conditions for image formation, other conditions that influence the reproducibility of thin lines may also be varied for examination.

Switching Giving Priority to Reproducibility of White Thin Lines

In the case for example where an input image is an image having a continuous change from a low gradation side to a high gradation side, or an image in which priority is given to reproduction of a region having a low gradation value rather than a region having a high gradation value such as an image including many white thin lines, minimum reproducible line width L is determined from the thicknesses of white thin lines. Referring to the characteristics in FIG. 12 that depend on the conditions influencing the reproducibility of thin lines, in the case where the conditions that influence the reproducibility of thin lines are for example the "low-temperature and low-humidity" environment, the "normal" amount of charge, and "new," minimum reproducible line width L in terms of the thicknesses of white thin lines is identified as 50 μm. In this case, image forming apparatus MFP accordingly uses 50 μm as the threshold value and identifies the position where thickness d of white thin lines becomes smaller than the threshold value as a position at which the screen is to be switched.

In this case, a comparison is made first with a region of a relatively low gradation side. In a low gradation side, a region of a relatively low gradation value is reproduced by means of the line screen, while a region of a relatively high gradation value is reproduced by means of the line screen. Therefore, image forming apparatus MFP calculates thickness d of white thin lines in the dot screen that is used for reproducing the region of the relatively low gradation value.

Figure 13:
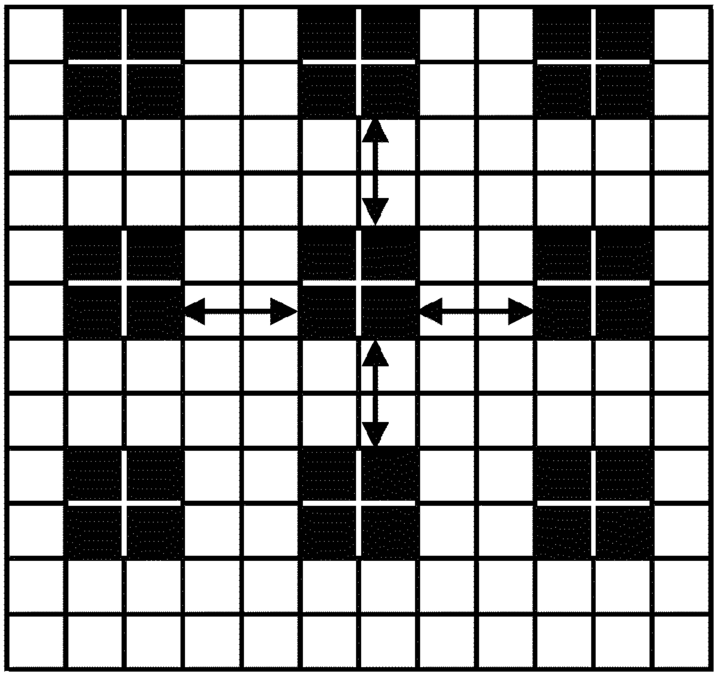
FIG. 13 is a diagram in which a pattern 212 of FIG. 11 is expanded to indicate thickness d of white thin lines.

By way of example, a description will be given of the case where pattern 212 is selected from the pattern variations in FIG. 11 in accordance with the gradation value for reproducing the region of the relatively low gradation value. FIG. 13 is a diagram in which pattern 212 of FIG. 11 is expanded to indicate thickness d of white thin lines. In this case, image forming apparatus MFP calculates thickness d of white lines in pattern 212 corresponding to the gradation value. Referring to FIG. 13, thickness d of white thin lines correspond to the minimum length of the whitened portions in the screen pattern that is the length of the portions indicated by the arrows, with respect to the central dot. One cell shown in FIG. 13 represents a pixel. In the case there the resolution is 600 dpi, the size of one pixel is about 42 μm. Therefore, the thickness in this case is $d=42\times2=84$ μm.

Image forming apparatus MFP compares the calculated thickness d (84 μm) of white thin lines in pattern 212 selected in accordance with the gradation value with minimum reproducible line width L (50 μm) which is the threshold value. As a result, thickness d of white thin lines in pattern 212 selected in accordance with the gradation value is $d>L$, and thus the switching condition $d<L$ is not satisfied. Image forming apparatus MFP therefore may determine that switching of the screen is not yet necessary for the current gradation value.

As the gradation value of a region to be reproduced is higher, the density of the dot pattern in the dot screen used for reproduction is higher than that of pattern 212 and accordingly each dot has a greater size. Accordingly, the minimum length of the whitened portion indicated by the arrows in FIG. 13 is smaller. When thickness d of white thin lines in the screen selected in accordance with the gradation value of the region to be reproduced reaches a thickness that satisfies the switching condition $d<L$, image forming apparatus MFP determines that this density (gradation value) corresponds to the position at which the dot screen is to be switched to the line screen, and switches the screen to be used to the line screen.

Likewise, in the case where an input image is an image of a high gradation value, a comparison is also made first with a region of a relatively low gradation side. In the high gradation side, a region of a relatively low gradation value is reproduced by means of the line screen, while a region of a relatively high gradation value is reproduced by means of the open dot screen. Therefore, in the case where pattern 215 in FIG. 11 is selected in accordance with the gradation value for reproducing the region of the relatively low gradation value, image forming apparatus MFP calculates thickness d of white thin lines in pattern 215 corresponding to the gradation value. Referring to FIG. 11, since thickness d of white thin lines in pattern 215 corresponds to one pixel, the thickness is d=42 μm in the case of the resolution of 600 dpi.

Image forming apparatus MFP compares the calculated thickness d (42 μm) of white thin lines in pattern 215 selected in accordance with the gradation value with minimum reproducible line width L (50 μm) that is the threshold value, and may determine that thickness d of white thin lines in pattern 215 selected in accordance with the gradation value has already satisfied the switching condition d<L.

In this case, switching from the line screen to the open dot screen for the current tone is too late. Switching must be done at lower gradation side, namely a gradation value for which the thickness of white thin lines is 50 μm.

Thus, in the case where image forming apparatus MFP gives priority to the reproducibility of white thin lines in an input image and reproduces the input image, the apparatus switches the dot screen to the line screen or switches the line screen to the open dot screen using, as a threshold value representing the position at which the screen is to be switched, a gradation value that allows thickness d of white thin lines to satisfy the above-described switching condition d<L. In this way, as shown in the results of examination in FIG. 12, white thin lines can be reproduced without being broken. The reproducibility of the screen pattern in this case can therefore be improved and a satisfactory halftone image can be reproduced.

Switching Giving Priority to Reproducibility of Black Thin Lines

In the case for example where an input image is an image having a continuous change from a high gradation side to a low gradation side, or an image in which priority is given to reproduction of a region having a high gradation value rather than a region having a low gradation value such as an image including many black thin lines, minimum reproducible line width L is determined from the thicknesses of black thin lines. Referring to the characteristics in FIG. 12 that depend on the conditions influencing the reproducibility of thin lines, in the case where the conditions that influence the reproducibility of thin lines are for example the "low-temperature and low-humidity" environment, the "normal" amount of charge, and "new," minimum reproducible line width L in terms of the thicknesses of black thin lines is identified as 40 μm. In this case, image forming apparatus MFP accordingly uses 40 μm as the threshold value and identifies the position where thickness d of black thin lines becomes smaller than the threshold value as a position at which the screen is to be switched.

In this case, a comparison is made first with a region of a relatively high gradation value. In a low gradation side, a region of a relatively high gradation value is reproduced by means of the line screen, while a region of a relatively low gradation value is reproduced by means of the dot screen. Therefore, image forming apparatus MFP calculates thickness d of black thin lines in the line screen that is used for reproducing the region of the relatively high gradation value.

By way of example, a description will be given of the case where pattern 213 is selected from the pattern variations in FIG. 11 in accordance with the gradation value for reproducing the region of the relatively high gradation value. In this case, image forming apparatus MFP calculates thickness d of black thin lines in pattern 213 corresponding to the gradation value. Referring to FIG. 11, since thickness d of black thin lines in pattern 213 corresponds to one pixel and is therefore d=42 μm in the case where the resolution is 600 dpi.

Image forming apparatus MFP compares thickness d (42 μm) of black thin lines in pattern 213 selected in accordance with the calculated gradation value with minimum reproducible line width L (40 μm) which is the threshold value. As a result, thickness d of black thin lines in pattern 213 selected in accordance with the gradation value is d>L, and thus the switching condition d<L is not satisfied. In this case, image forming apparatus MFP therefore may switch the line screen to the dot screen as illustrated by the pattern variations in FIG. 11, or may wait until the gradation value of the region to be reproduced becomes a little smaller and then switch the screen when thickness d of black thin lines in the line screen becomes 40 μm which satisfies the switching condition d<L.

Likewise, in the case where an input image is an image of a high gradation value, a comparison is also made first with a region of a relatively high gradation side. In the high gradation side, a region of a relatively high gradation value is reproduced by means of the open dot screen, while a region of a relatively low gradation value is reproduced by means of the line screen. Therefore, in the case where pattern 216 in FIG. 11 is selected in accordance with the gradation value for reproducing the region of the relatively high gradation value, image forming apparatus MFP calculates thickness d of black thin lines in pattern 216 corresponding to the gradation value. Referring to FIG. 11, since thickness d of black thin lines in pattern 216 corresponds to two pixels, the thickness is d=42×2=84 μm in the case of the resolution of 600 dpi.

Image forming apparatus MFP compares thickness d (84 μm) of black thin lines in pattern 216 selected in accordance with the calculated gradation value with minimum reproducible line width L (40 μm) that is the threshold value. As a result, thickness d of black thin lines in currently-used pattern 216 is d>L which does not satisfy the switching condition d<L. Therefore, in this case, image forming apparatus MFP may switch the open dot screen to the line screen as shown by the pattern variations in FIG. 11, or may continue using the open dot screen without switching it until the gradation value becomes a little lower and, when thickness d of black thin lines in the open dot screen becomes 40 μm and satisfies the switching condition d<L, image forming apparatus MFP may switch the screen.

Thus, in the case where image forming apparatus MFP gives priority to the reproducibility of black thin lines in an input image and reproduces the input image, the apparatus switches the line screen to the dot screen or switches the open dot screen to the line screen using, as a threshold value representing the position at which the screen is to be switched, a gradation value that allows thickness d of black thin lines to satisfy the above-described switching condition d<L. In this way, as shown in the results of examination in FIG. 12, black thin lines can be reproduced without being broken. The reproducibility of the screen pattern in this case can therefore be improved and a satisfactory halftone image can be reproduced.

Description of Minimum Line Width L

Regarding electrophotography, generally the exposing device uses a large number of laser scanners or LEDs arranged in parallel to form a latent image. Therefore, the examination results shown in FIG. 12 may vary in terms of the resultant reproducibility depending on the direction in which an image of thin lines is formed, even if the same image forming apparatus is used. The direction in which an image of thin lines is formed, namely screen angle θ, is identified based on a reproduction mode. Therefore, preferably image forming apparatus MFP of the present embodiment stores characteristics of the reproducibility as shown in FIG. 12 for each screen angle θ. Image forming apparatus MFP then identifies screen angle θ based on the reproduction mode, reads the corresponding characteristics to be used, and identify minimum reproducible line width L based on the characteristics. When thickness d of thin lines for a gradation value to be reproduced is smaller than the determined minimum reproducible line width L, the image forming apparatus can switch the dot screen and the line screen to/from each other to thereby further enhance the reproducibility.

The present embodiment provides monochrome image forming apparatus MFP. In the case where the image forming apparatus is a color machine of two or more colors or a full-color machine in which toners of four or more colors are provided in advance, image forming apparatus MFP may further store characteristics of the reproducibility for each color. Image forming apparatus MFP then identifies the color included in image data to be reproduced, reads the characteristics corresponding to the color, and identifies minimum reproducible line width L based on the characteristics.

<Configuration of Control Unit>

Figure 14:
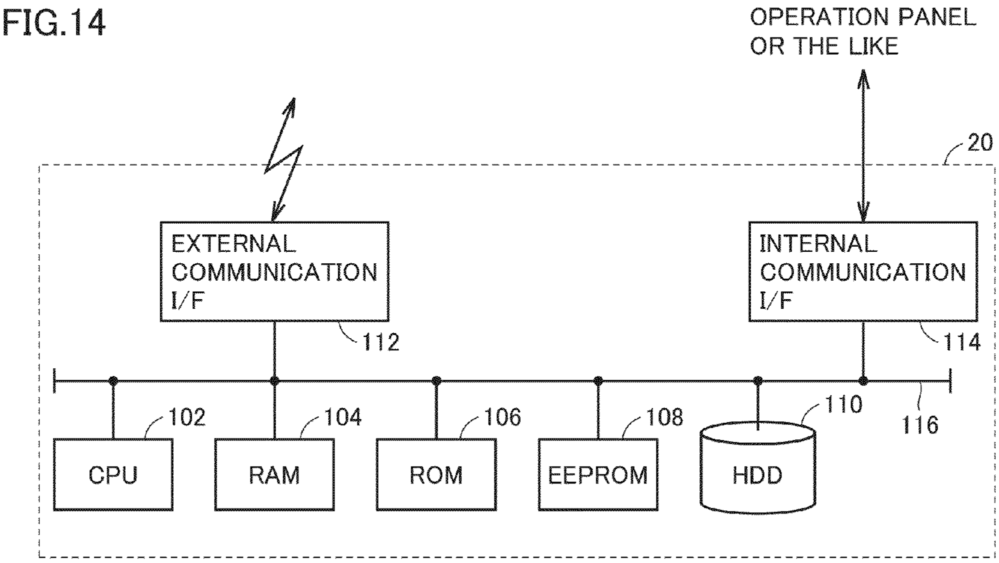
FIG. 14 is a schematic diagram showing a hardware configuration of a control unit in the image forming apparatus according to the embodiment.

FIG. 14 is a schematic diagram showing a hardware configuration of control unit 20 in image forming apparatus MFP according to the embodiment of the present invention.

Referring to FIG. 14, controller 20 includes a CPU (Central Processing Unit) 102 that is of a processing unit, a RAM (Random Access Memory) 104, a ROM (Read Only Memory) 106, an EEPROM (Electrical Erasable and Programmable Read Only Memory) 108, and an HDD (Hard Disk Drive) 110, which are of storage units, and an external communication I/F (Interface) 112 and an internal communication I/F 114, which are of communication units. These units are connected to one another through an internal bus 116.

In controller 20, CPU 102 loads a program, stored previously in ROM 106 to execute various pieces of processing, in RAM 104 and executes the program to control image forming apparatus MFP.

RAM 104 is a volatile memory used as a work memory. More specifically, in addition to the executed program, the image data of the processing target and various pieces of variable data are tentatively stored in RAM 104. Typically, EEPROM 108 is a nonvolatile semiconductor memory in which various setting values such as an IP address and a network domain of image forming apparatus MFP are stored. Typically, HDD 110 is a nonvolatile magnetic memory in which a print job received from the image processing device and the image information obtained by scanner 3 are stored.

Typically, external communication I/F 112 supports a general-purpose communication protocol such as Ethernet® and provides data communication with a personal computer PC or another image forming apparatus through a network NW.

Internal communication I/F 114 is connected to an operation panel. Internal communication I/F 114 receives a signal corresponding to the user operation performed to the operation panel and transmits the signal to CPU 102, and internal communication I/F 114 transmits a signal necessary to display a message on the operation panel in response to a command from CPU 102.

<Control Structure>

Figure 15:
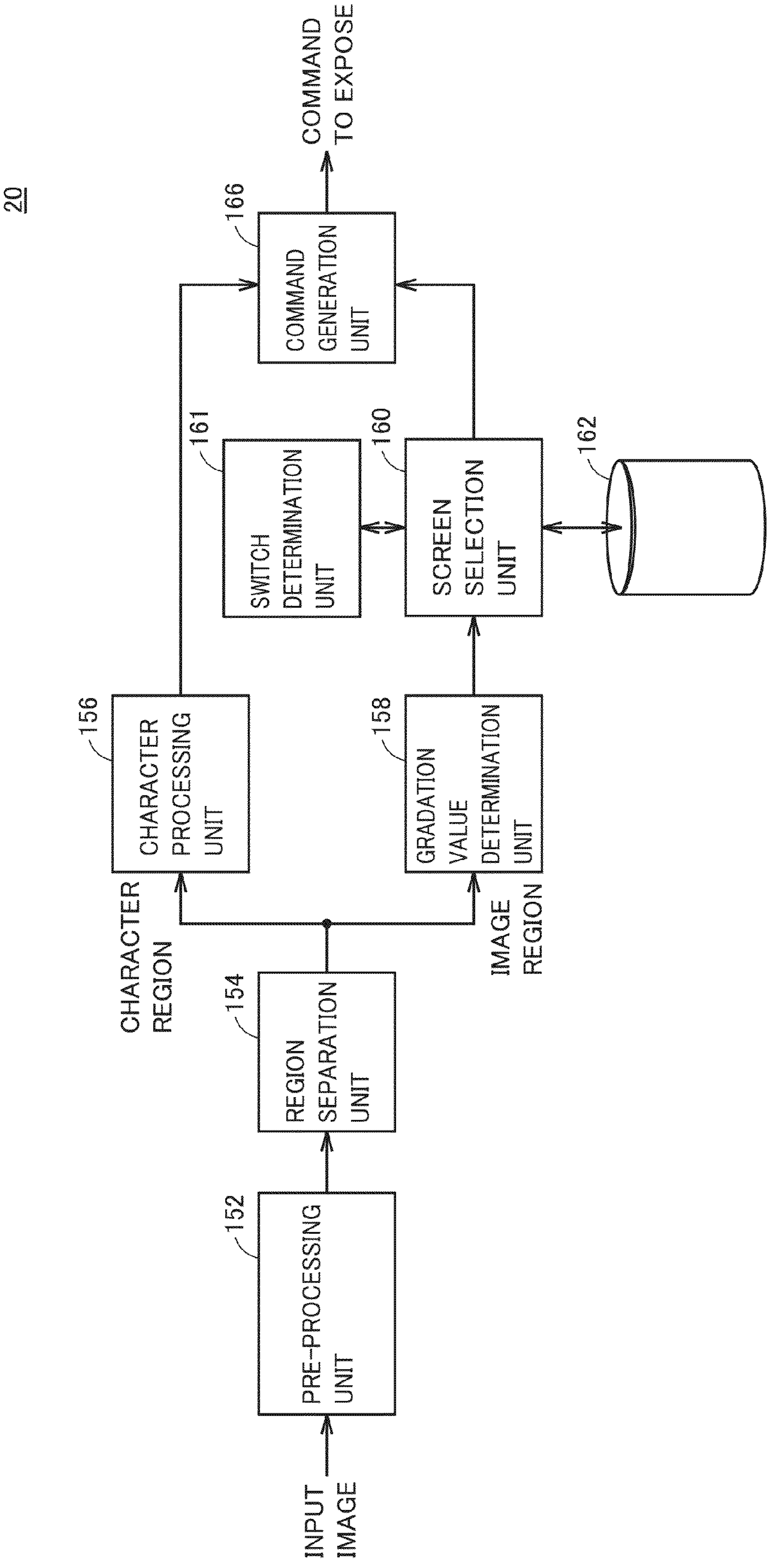
FIG. 15 is a block diagram showing a control structure of the control unit in the image forming apparatus according to the embodiment.

FIG. 15 is a block diagram showing a control structure of control unit 20 in image forming apparatus MFP according to the embodiment of the present invention.

Referring to FIG. 15, in order to form an electrostatic latent image on photoconductor 1 in accordance with an input image to be printed, control unit 20 outputs a command (command to expose) to the exposing device. More specifically, control unit 20 has its control structure including a pre-processing unit 152, a region separation unit 154, a character processing unit 156, a gradation value determination unit 158, a screen selection unit 160, a switch determination unit 161, a screen storage unit 162, and a command generation unit 166.

When an image is to be reproduced, a reproduction mode is provided through a user's operation for example to control unit 20. A reproduction mode refers to a defined degree of the reproducibility. For example, a photo mode and a character mode may be provided. The photo mode is defined as a high degree of reproducibility, while the character mode is defined as a low degree of reproducibility. The reproduction mode is associated with a screen angle θ.

Screen storage unit 162 is provided as a predetermined region included in RAM 104, EEPROM 108, and HDD 110. Other components are typically provided by CPU 102 through expansion of a program on RAM 104 and execution of each command.

Screen storage unit 162 stores screen groups used for reproducing gradation values, a correspondence between a reproduction mode and a screen angle, and the characteristics shown in FIG. 12.

Pre-processing unit 152 performs pre-processing such as color correction on an input image to be printed. The input image processed by this pre-processing unit 152 is output to region separation unit 154.

Region separation unit 154 separates the input image received from pre-processing unit 152 into a character region and an image region. Basically, the character region is a portion which is not necessary to be reproduced in the form of intermediate gradation, while the image region is a portion which is necessary to be reproduced in the form of intermediate gradation. Information about the character region separated by region separation unit 154 is output to character processing unit 156 while information about the image region is output to gradation value determination unit 158.

Character processing unit 156 performs processing appropriate for characters such as contour enhancement, on the information about the character region received from region separation unit 154. Character processing unit 156 then outputs the result of processing to command generation unit 166.

Gradation value determination unit 158 determines gradation values to be reproduced for predetermined unit regions respectively, based on the information about the image region received from region separation unit 154. Gradation value determination unit 158 then outputs the result of determination to screen selection unit 160.

Switch determination unit 161 refers to screen storage unit 162 to identify screen angle θ corresponding to a reproduction mode which has been input, and reads characteristics of the reproducibility associated with this screen angle θ from the characteristics of the reproducibility for respective screen angles as shown in FIG. 12. Switch determination unit 161 also obtains conditions such as temperature that influence the reproducibility of thin lines, from a sensor or the like (not shown). Based on the read characteristics and the conditions that influence the reproducibility of thin lines, switch determination unit 161 identifies a minimum reproducible line width L1 of black thin lines and a minimum reproducible line width L2 of white thin lines. Further, switch determination unit 161 calculates the thickness of white thin lines and the thickness of black thin lines in each of the screens stored in screen storage unit 162, and compares them with minimum reproducible line widths L1, L2. Based on the above-described switching condition, switch determination unit 161 determines, for the case where priority is given to the reproducibility of white thin lines, a gradation value Th1 for a low gradation side that corresponds to the position at which the dot screen is switched to the line screen, and a gradation value Th2 for a high gradation side that corresponds to the position at which the line screen is switched to the dot screen (open dot screen). Switch determination unit 161 also determines, for the case where priority is given to the reproducibility of black thin lines, a gradation value Th3 for a low gradation side that corresponds to the position at which the line screen is switched to the dot screen, and a gradation value Th4 for a high gradation side that corresponds to the position at which the dot screen (open dot screen) is switched to the line screen. These thresholds of the gradation value that represent respective positions at which the screen is switched are provided to screen selection unit 160.

Screen selection unit 160 refers to the reproduction mode stored in a storage area (not shown) to identify whether priority is given to the reproducibility of white thin lines or to the reproducibility of black thin lines, then selects a threshold value to be used, from the threshold values of the gradation value provided from switch determination unit 161, compares the threshold value with a density to be reproduced that has been input, and determines a pattern of screen to be selected. Then, from screens including the determined pattern (dot pattern, line pattern), screen selection unit 160 selects screens in turn in accordance with the density to be reproduced, based on the result of determination received from gradation value determination unit 158. More specifically, screen selection unit 160 refers to the screens stored in screen storage unit 162 to determine the screen corresponding to the density to be reproduced. Then, it maps the selected screen on the image region. Screen selection unit 160 outputs the result of mapping to command generation unit 166.

Command generation unit 166 synthesizes the result of processing received from character processing unit 156 and the result of mapping received from screen selection unit 160 to thereby generate a command to expose corresponding to the input image. At this time, for the image region of the input image, respective gradation values of pixels are referenced. The command to expose is then output to the exposing unit. Namely, this command to expose causes an image forming process to be performed based on the selected screen.

<Process Procedure>

Figure 16:
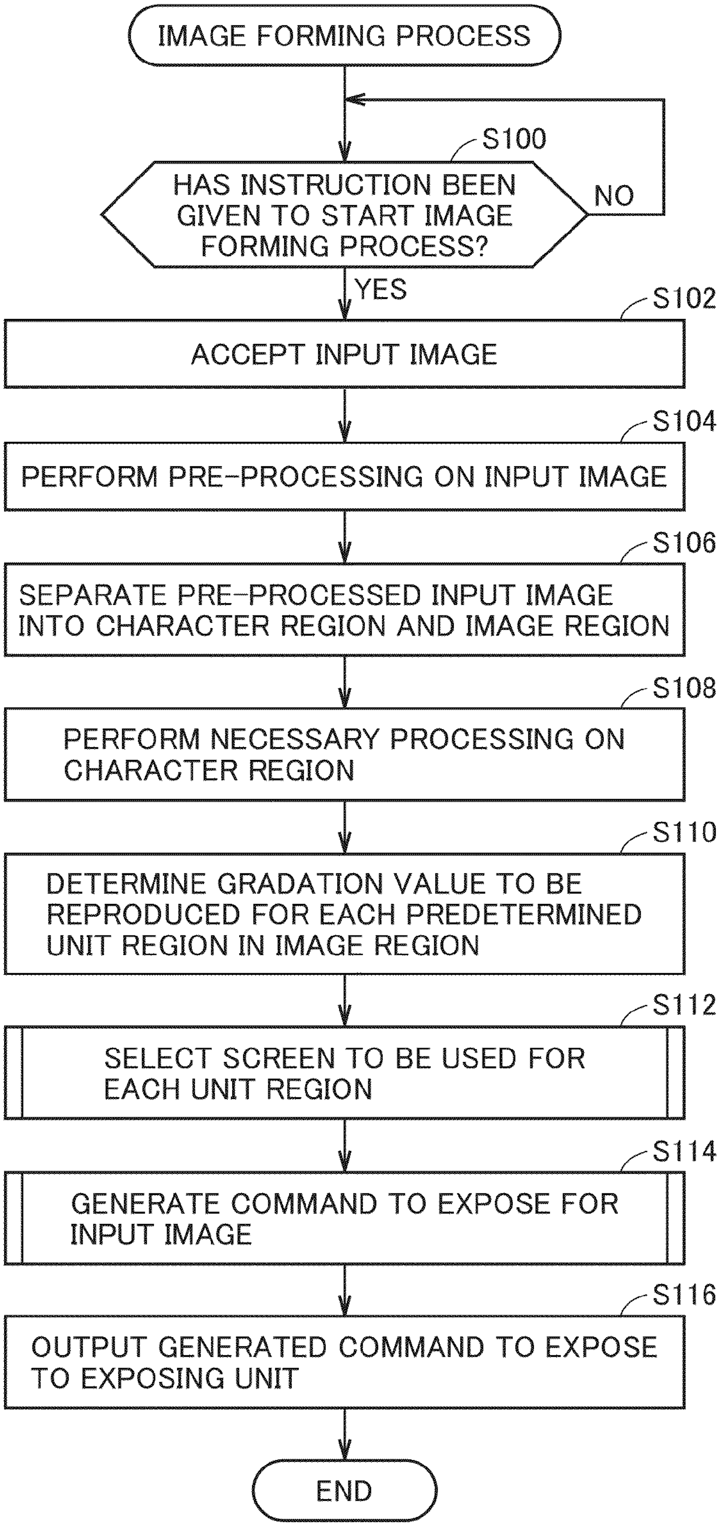
FIG. 16 is a flowchart showing a procedure of an image forming process in the image forming apparatus according to the embodiment.

FIG. 16 is a flowchart showing a procedure of an image forming process in image forming apparatus MFP according to the embodiment of the present invention. This flowchart is typically provided by CPU 102 of control unit 20 through its reading and execution of a program stored in advance.

Referring to FIG. 16, CPU 102 first determines whether or not an instruction to start the image forming process has been given (step S100). When the instruction to start the image forming process has not been given (NO in step S100), CPU 102 repeats the operation of step S100.

When the instruction to start the image forming process has been given (YES in step S100), CPU 102 accepts an input image (step S102). Specifically, CPU 102 causes an original to be scanned. Alternatively, CPU 102 may read specified image data from HDD 110 for example.

Subsequently, CPU 102 performs pre-processing on the accepted input image (step S104), and further separates the pre-processed input image into a character region and an image region (step S106). After this, CPU 102 performs necessary processing on the character region separated in step S106 (step S108).

In parallel with this, CPU 102 determines a gradation value to be reproduced in each predetermined unit region in the image region separated in step S106 (step S110) and, based on the result of this determination, selects a screen to be used for each unit region (step S112).

Based on the result of processing that is output in step S108 and the screen selected in step S112 as well as the pixel value of the image region, CPU 102 generates a command to expose (step S114) for the input image, and outputs the generated command to expose to the exposing unit (step S116). The exposing unit then performs the image forming process based on the command to expose. The process is then ended.

Next, with reference to FIG. 17, a description will be given of a process of calculating threshold values for switching screens in image forming apparatus MFP according to the present embodiment. This process is executed when a predetermined condition is met, for example, when image forming apparatus MFP is activated, after a predetermined number of sheets has been printed, or when the reproduction mode is changed.

Figure 17:
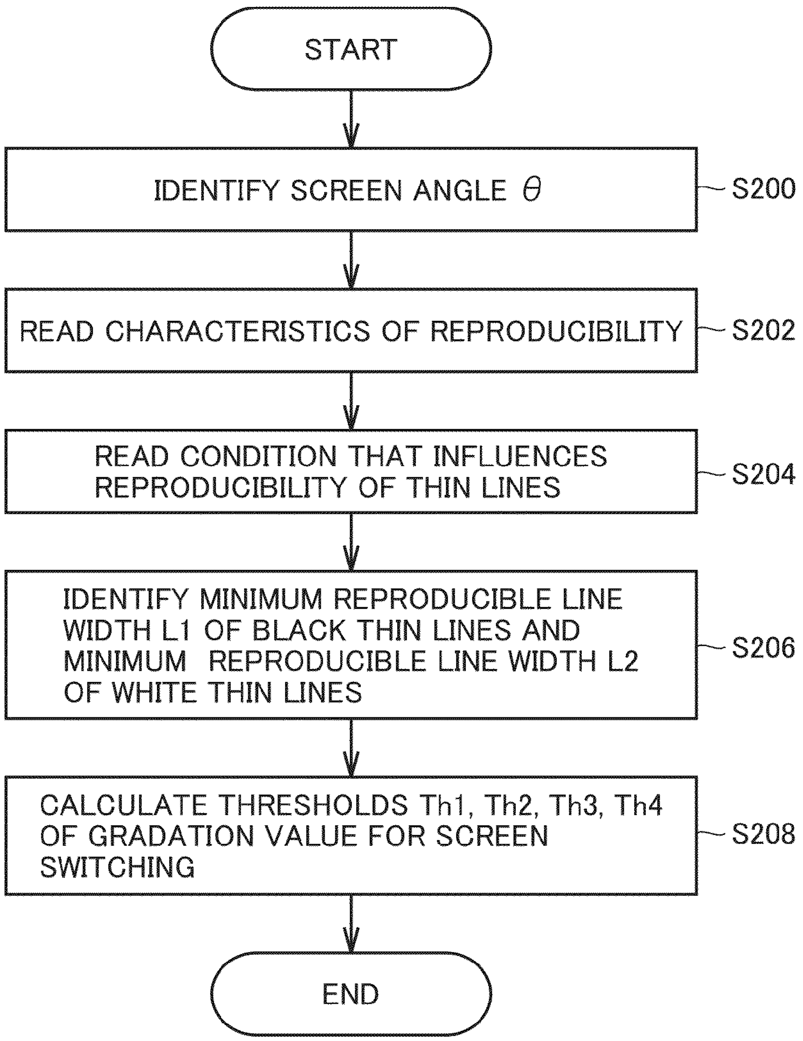
FIG. 17 is a flowchart showing a procedure of a process of calculating a threshold value for switching screens in the image forming apparatus according to the embodiment.

Referring to FIG. 17, as the process is started when the above-described predetermined condition is met, CPU 102 identifies screen angle θ based on a reproduction mode having been set (step S200). CPU 102 then reads, from characteristics of the reproducibility stored for respective screen angles, the characteristics of the reproducibility associated with the identified screen angle θ (step S202).

CPU 102 also obtains from a sensor (not shown) or the like each condition that influences the reproducibility of thin lines that has been defined in connection with the specified reproducibility, such as the environmental condition for image formation, the condition of the amount of charge given to the toner, and the condition of the status of use of the apparatus (step S204). CPU 102 then refers to values that satisfy the above-described conditions of the read characteristics of the reproducibility to identify minimum reproducible line width L1 of black thin lines and minimum reproducible line width L2 of white thin lines (step S206).

CPU 102 further calculates thickness d1 of black thin lines and thickness d2 of white thin lines for each of the stored screens, and compares minimum reproducible line width L1 of black thin lines with thickness d1 of black thin lines and compares minimum reproducible line width L2 of white thin lines with thickness d2 of white thin lines. CPU 102 thereby determines, for the case where priority is given to the reproducibility of white thin lines, gradation value Th1 for a low gradation side corresponding to the position at which the dot screen is switched to the line screen, and gradation value Th2 for a high gradation side corresponding to the position at which the line screen is switched to the dot screen (open dot screen), and determines, for the case where priority is given to the reproducibility of black thin lines, gradation value Th3 for a low gradation side corresponding to the position at which the line screen is switched to the dot screen, and gradation value Th4 for a high gradation side corresponding to the position at which the dot screen (open dot screen) is switched to the line screen (step S208). The process is then ended.

Next, with reference to FIG. 18, selection of a screen (step S112) in image forming apparatus MFP according to the present embodiment will be described.

Figure 18:
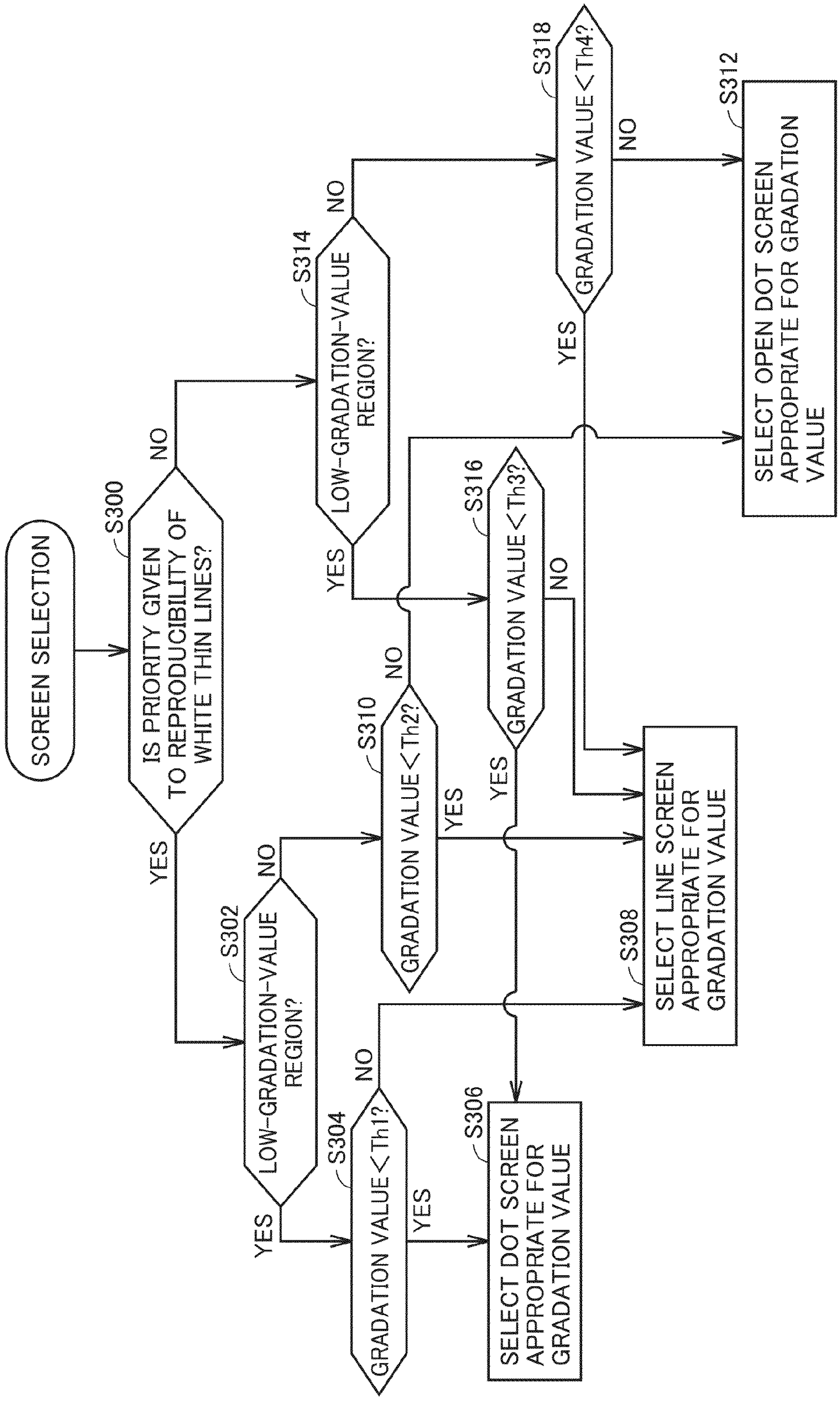
FIG. 18 is a flowchart showing a procedure of a screen selection process in the image forming apparatus according to the embodiment.

Referring to FIG. 18, when the reproduction mode gives priority to the reproducibility of white thin lines for a predetermined unit region to be processed (YES in step S300) and when the region is a low-gradation-value region (YES in step S302), CPU 102 compares the gradation value to be reproduced with threshold value Th1 of the gradation value corresponding to the position where the dot screen is switched to the line screen. When the result of comparison indicates that the gradation value to be reproduced is smaller than threshold value Th1 (YES in step S304), CPU 102 determines to reproduce it using the dot screen and selects a dot screen appropriate for the gradation value to be reproduced (step S306). When the gradation value to be reproduced is larger than threshold value Th1 (NO in step S304), CPU 102 determines to reproduce it using the line screen, and selects a line screen appropriate for the gradation value to be reproduced (step S308).

When the reproduction mode gives priority to the reproducibility of white thin lines (YES in step S300) and the region is a high-gradation-value region (NO in step S302), CPU 302 compares the gradation value to be reproduced with threshold value Th2 of the gradation value corresponding to the position where the line screen is switched to the open dot screen. When the result of comparison indicates that the gradation value to be reproduced is smaller than threshold value Th2 (YES in step S310), CPU 102 determines to reproduce it using the line screen, and selects a line screen appropriate for the gradation value to be reproduced (step S308). When the gradation value to be reproduced is larger than threshold value Th2 (NO in step S310), CPU 102 determines to reproduce it using the open dot screen, and selects an open dot screen appropriate for the gradation value to be reproduced (step S312).

When the reproduction mode gives priority to the reproducibility of black thin lines (NO in step S300) and when the region to be processed is a low-gradation-value region (YES in step S314), CPU 102 compares the gradation value to be reproduced with threshold value Th3 of the gradation value corresponding to the position where the line screen is switched to the dot screen. When the result of comparison indicates that the gradation value to be reproduced is smaller than threshold value Th3 (YES in step S316), CPU 102 determines to reproduce it using the dot screen, and selects a dot screen appropriate for the gradation value to be reproduced (step S306). When the gradation value to be reproduced is larger than threshold value Th3 (NO in step S316), CPU 102 determines to reproduce it using the line screen, and selects a line screen appropriate for the gradation value to be reproduced (step S308).

When the reproduction mode gives priority to the reproducibility of black thin lines (NO in step S300) and when the region to be processed is a high-gradation-value region (NO in step S314), CPU 102 compares the gradation value to be reproduced with threshold value Th4 of the gradation value corresponding to the position where the open dot screen is switched to the line screen. When the result of comparison indicates that the gradation value to be reproduced is smaller than threshold value Th4 (YES in step S318), CPU 102 determines to reproduce it using the line screen, and selects a line screen appropriate for the gradation value to be reproduced (step S308). When the gradation value to be reproduced is larger than threshold value Th4 (NO in step S318), CPU 102 determines to reproduce it using the open dot screen, and selects an open dot screen appropriate for the gradation value to be reproduced (step S312).

The above-described process is performed for each predetermined unit region to be processed, and accordingly screens to be used are selected for the whole region.

Figure 19A:
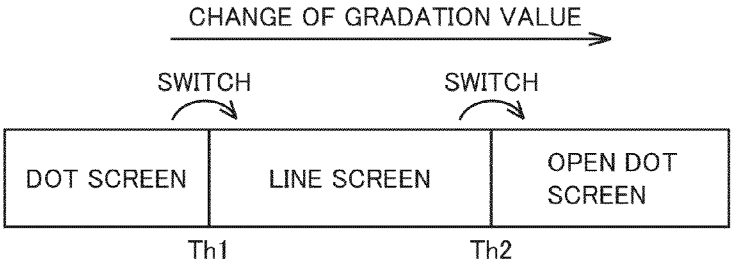
FIGS. 19A and 19B are each a diagram schematically showing switching of screens in the image forming apparatus according to the embodiment.
Figure 19B:
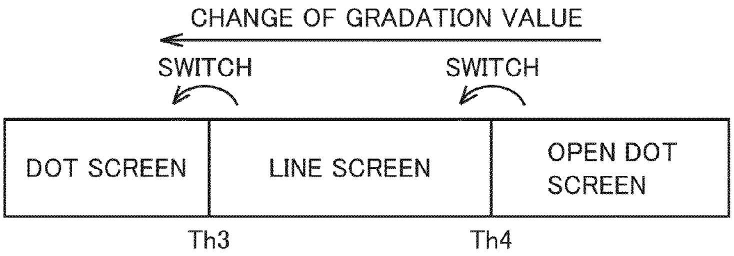

FIGS. 19A and 19B are each a diagram schematically showing switching of screens in image forming apparatus MFP according to the present embodiment. FIG. 19A schematically shows switching of screens in the case where an image is reproduced that has a continuous change of the gradation value from a low gradation side to a high gradation side. FIG. 19B schematically shows switching of screens in the case where an image is reproduced that has a continuous change of the gradation value from a high gradation side to a low gradation side. In the case where an image in which the gradation value continuously changes from a low gradation side to a high gradation side is reproduced, the above-described process is performed in image forming apparatus MFP of the present embodiment to use a dot screen until the gradation value changes from a relatively smaller value and reaches threshold value Th1. When threshold value Th1 is exceeded, the screen is switched to the line screen. When the gradation value further exceeds threshold value Th2, the screen is switched to the open dot screen (FIG. 19A). In the case where an image in which the gradation value continuously changes from a high gradation side to a low gradation side is reproduced, the open dot screen is used until the gradation value changes from a relatively high gradation side and reaches threshold value Th4. When the gradation value becomes smaller than threshold value Th4, the screen is switched to the line screen. When the gradation value becomes smaller than threshold value Th3, the screen is switched to the dot screen (FIG. 19B). Accordingly, the thickness of thin lines in each screen is larger than the minimum reproducible line width, and therefore, the reproducibility of the screen pattern can be enhanced and an excellent halftone image can be reproduced.

[Modification]

In the example above, threshold values Th1 to Th4 of the gradation value that correspond to respective positions at which the screen is switched are determined in advance, and the gradation value and the threshold value are compared with each other for each predetermined unit region to be reproduced so as to determine the screen pattern.

In another example, a screen may be selected in accordance with the gradation value of a predetermined unit region to be reproduced, then thickness d1 of black thin lines or thickness d2 of white thin lines of the screen may be calculated, the thickness may be compared with minimum reproducible line width L1 of black thin lines or minimum reproducible line width L2 of white thin lines that is derived from the characteristics of the reproducibility corresponding to screen angle θ identified based on the reproduction mode, and thereby whether to switch the selected screen or not may be determined.

In this case, CPU 102 may obtain in advance minimum reproducible line width L1 of black thin lines or minimum reproducible line width L2 of white thin lines based on the characteristics of the reproducibility corresponding to screen angle θ. Thus, the process of determining threshold values Th1 to Th4 can be skipped.

A part or the whole of functions implemented by the program according to the above-described embodiment may be configured by means of dedicated hardware.

The program executed by the CPU according to the above-described embodiment may call required modules in a predetermined sequence and at predetermined timings from program modules provided as a part of an operating system (OS) of a computer and cause processing to be performed. In this case, the above-described modules are not included in the program itself, and processing is executed in cooperation with the OS. Therefore, such a program that does not include these modules may be included in the program of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrophotographic image forming apparatus selecting a screen from a plurality of screens corresponding respectively to a plurality of gradation values to form a toner image on media, said plurality of screens each including a pattern in which a first region to which toner is to adhere and a second region to which toner is not to adhere are defined, said image forming apparatus comprising:

a storage device;

an image forming unit; and a controller, said storage device including a storage area for storing a minimum formable distance between first regions adjacent to each other or second regions adjacent to each other, and said controller performing:

a process of calculating a distance between said first regions adjacent to each other or second regions adjacent to each other of said screen;

a process, when a distance between said first regions adjacent to each other or second regions adjacent to each other of the screen of said plurality of screens that corresponds to a gradation value of an input image and has a first pattern is smaller than said minimum formable distance, of switching screen pattern to a second pattern different from said first pattern, and selecting from said plurality of screens a screen corresponding to the gradation value of said input image and having said second pattern; and a process of causing said image forming unit to perform image formation using said selected screen.

2. The image forming apparatus according to claim 1, wherein one of said first pattern and said second pattern is a dot pattern and the other is a line pattern.

3. The image forming apparatus according to claim 1, wherein in said storage area, a first minimum value associated with reproduction of white thin line and a second minimum value associated with reproduction of black thin line are stored each as said minimum formable distance.

4. The image forming apparatus according to claim 1, wherein in said process of selecting, said controller selects, as a screen after the pattern is switched, a screen having said second pattern, so that a distance between said first regions adjacent to each other of a high gradation value after or before said screen pattern is switched is greater than that of a low gradation value before or after said screen pattern is switched.

5. The image forming apparatus according to claim 1, wherein when priority is given to reproducibility of white thin line rather than reproducibility of black thin line, said controller performs said process of calculating to calculate a distance between said second regions adjacent to each other of said screen, and said controller performs said process of selecting to use said second pattern as screen pattern, when the distance between said second regions adjacent to each other of a screen that is one of said plurality of screens and corresponds to a gradation value of an input image is smaller than said minimum formable distance.

6. The image forming apparatus according to claim 5, wherein when a minimum value of the distance between said second regions adjacent to each other of the screen having a dot pattern selected in said process of selecting decreases to reach said minimum formable distance, as the gradation value of said input image increases, said controller performs said process of selecting to use a line pattern as screen pattern and select from said plurality of screens a screen corresponding to the gradation value of said input image and having the line pattern.

7. The image forming apparatus according to claim 5, wherein when a minimum value of the distance between said second regions adjacent to each other of the screen having a line pattern selected in said process of selecting decreases to reach said minimum formable distance, as the gradation value of said input image increases, said controller performs said process of selecting to use a dot pattern as screen pattern and select from said plurality of screens a screen corresponding to the gradation value of said input image and having the dot pattern.

8. The image forming apparatus according to claim 1, wherein when priority is given to reproducibility of black thin line rather than reproducibility of white thin line, said controller performs said process of calculating to calculate a distance between said first regions adjacent to each other of said screen, and said controller performs said process of selecting to use said second pattern as screen pattern, when the distance between said first regions adjacent to each other of the screen that is one of said plurality of screens and corresponds to a gradation value of an input image is smaller than said minimum formable distance.

9. The image forming apparatus according to claim 8, wherein when a minimum value of the distance said first regions adjacent to each other of the screen having a dot pattern selected in said process of selecting decreases to reach said minimum formable distance, as the gradation value of said input image decreases, said controller performs said process of selecting to use a line pattern as screen pattern and select from said plurality of screens a screen corresponding to the gradation value of said input image and having the line pattern.

10. The image forming apparatus according to claim 8, wherein when a minimum value of the distance between said first regions adjacent to each other of the screen having a line pattern selected in said process of selecting decreases to reach said minimum formable distance, as the gradation value of said input image decreases, said controller performs said process of selecting to use a dot pattern as screen pattern and select from said plurality of screens a screen corresponding to the gradation value of said input image and having the dot pattern.

11. The image forming apparatus according to claim 1, wherein in said process of selecting, said controller uses, as a threshold value, a gradation value corresponding to a screen having a pattern in which the distance between said first regions adjacent to each other or second regions adjacent to each other corresponds to said minimum formable distance, compares the gradation value of said input image with said threshold value to deter mine a screen pattern, and selects from said plurality of screens a screen corresponding to the gradation value of said input image and having said determined pattern.

12. The image forming apparatus according to claim 1, wherein in said process of selecting, said controller selects from said plurality of screens a screen corresponding to the gradation value of said input image and having said first pattern, uses said second pattern as screen pattern when the distance between said first regions adjacent to each other or second regions adjacent to each other of said selected screen is smaller than said minimum formable distance, and selects from said plurality of screens a screen corresponding to the gradation value of said input image and having said second pattern.

13. The image forming apparatus according to claim 1, wherein in said storage area, said minimum formable distance is stored for each condition that influences reproducibility, and said controller further performs a process of obtaining a condition that influences reproducibility and identifying said minimum formable distance associated with said condition.

14. The image forming apparatus according to claim 13, wherein in said storage area, said minimum formable distance is stored for each screen angle, and said controller performs said process of identifying to identify said minimum formable distance associated with the obtained condition that influences reproducibility and with said screen angle.

15. An electrophotographic image forming method selecting a screen from a plurality of screens corresponding respectively to a plurality of gradation values to form a toner image on media, said plurality of screens each including a pattern in which a first region to which toner is to adhere and a second region to which toner is not to adhere are defined, said image forming method comprising the steps of:

reading from a storage device a minimum formable distance between first regions adjacent to each other or second regions adjacent to each other, said minimum formable distance being formable by an image forming apparatus associated with the condition;

calculating a width of a thin line of said screen;

when the distance between said first regions adjacent to each other or second regions adjacent to each other of a screen that is one of said plurality of screens, corresponds to a gradation value of an input image, and has a first pattern, is smaller than said minimum formable distance, switching screen pattern to a second pattern different from said first pattern, and selecting from said plurality of screens a screen corresponding to the gradation value of said input image and having said second pattern; and performing image formation using said selected screen.

16. A non-transitory computer-readable recording medium on which a program is recorded for causing an image forming apparatus to perform an image forming process based on electrophotography selecting a screen from a plurality of screens corresponding respectively to a plurality of gradation values to form a toner image on media, said plurality of screens each including a pattern in which a first region to which toner is to adhere and a second region to which toner is not to adhere are defined, said program causing said image forming apparatus to perform the steps of:

reading from a storage device a minimum formable distance between first regions adjacent to each other or second regions adjacent to each other, said minimum formable distance being formable by said image forming apparatus associated with the condition;

calculating a width of a thin line of said screen;

when the distance between said first regions adjacent to each other or second regions adjacent to each other of a screen that is one of said plurality of screens, corresponds to a gradation value of an input image, and has a first pattern, is smaller than said minimum formable distance, switching screen pattern to a second pattern different from said first pattern, and selecting from said plurality of screens a screen corresponding to the gradation value of said input image and having said second pattern; and performing image formation using said selected screen.

* * * * *